United States Patent
Oh et al.

(10) Patent No.: US 9,407,951 B2
(45) Date of Patent: Aug. 2, 2016

(54) IMAGE DISPLAY APPARATUS AND METHOD FOR OPERATING THE SAME

(75) Inventors: Hyo Jung Oh, Seoul (KR); Kwang Soo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/819,603

(22) PCT Filed: Dec. 17, 2010

(86) PCT No.: PCT/KR2010/009047
§ 371 (c)(1),
(2), (4) Date: Jun. 12, 2013

(87) PCT Pub. No.: WO2012/030025
PCT Pub. Date: Mar. 8, 2012

(65) Prior Publication Data
US 2013/0276031 A1    Oct. 17, 2013

Related U.S. Application Data

(60) Provisional application No. 61/379,371, filed on Sep. 1, 2010.

(30) Foreign Application Priority Data

Sep. 2, 2010    (KR) .................. 10-2010-0086150

(51) Int. Cl.
H04N 5/445    (2011.01)
H04N 21/431    (2011.01)
H04N 21/462    (2011.01)
H04N 21/41    (2011.01)

(52) U.S. Cl.
CPC .......... *H04N 21/431* (2013.01); *H04N 21/4312* (2013.01); *H04N 21/4622* (2013.01); *H04N 21/4104* (2013.01)

(58) Field of Classification Search
CPC ............ H04N 21/812; H04N 21/4438; H04N 5/44543
See application file for complete search history.

(56) References Cited

U.S. PATENT DOCUMENTS

| | | |
|---|---|---|
| 6,526,577 B1 | 2/2003 | Knudson et al. |
| 2005/0028200 A1* | 2/2005 | Sardera ..................... 725/42 |
| 2006/0200381 A1* | 9/2006 | Elkholy et al. ................. 705/14 |
| 2008/0046933 A1 | 2/2008 | Kim et al. |
| 2008/0168521 A1* | 7/2008 | Hsu et al. ..................... 725/131 |
| 2008/0178218 A1 | 7/2008 | Pickelsimer |
| 2008/0307454 A1 | 12/2008 | Ahanger et al. |

(Continued)

FOREIGN PATENT DOCUMENTS

| | | |
|---|---|---|
| CN | 1783945 A | 6/2006 |
| CN | 101340560 A | 1/2009 |

(Continued)

*Primary Examiner* — Jefferey Harold
*Assistant Examiner* — Samira Monshi
(74) *Attorney, Agent, or Firm* — Birch, Stewart, Kolasch & Birch, LLP

(57) ABSTRACT

An image display apparatus for receiving and processing a broadcast signal and a method for operating the same are disclosed. The method includes receiving a notification through a network interface or a tuner, generating a promotion card object including the notification by processing the received notification by a card object generator, and displaying the promotion card object on a display.

15 Claims, 34 Drawing Sheets

(56) References Cited

U.S. PATENT DOCUMENTS

| | | |
|---|---|---|
| 2009/0007172 A1 | 1/2009 | Ahanger et al. |
| 2009/0237372 A1* | 9/2009 | Kim et al. ............ 345/173 |
| 2010/0017825 A1 | 1/2010 | Shin et al. |
| 2010/0315334 A1* | 12/2010 | Choi et al. ............ 345/157 |
| 2011/0025925 A1* | 2/2011 | Hansen ............ 348/734 |
| 2011/0161442 A1* | 6/2011 | Bouazizi ............ 709/206 |
| 2011/0283320 A1* | 11/2011 | Levin et al. ............ 725/40 |
| 2013/0067510 A1* | 3/2013 | Ahanger et al. ............ 725/34 |

FOREIGN PATENT DOCUMENTS

| | | |
|---|---|---|
| CN | 101539834 A | 9/2009 |
| EP | 0 670 652 A1 | 9/1995 |
| KR | 10-2004-0066222 A | 7/2004 |
| KR | 10-2010-0006846 A | 1/2010 |
| KR | 10-2010-0050067 A | 5/2010 |
| WO | WO 02/11441 A1 | 2/2002 |
| WO | WO 2011/126202 A1 | 10/2011 |
| WO | WO 2011/159006 A1 | 12/2011 |

* cited by examiner (a)　　　　　　　　　(b)

(a)　　　　　　　　　(b)

IMAGE DISPLAY APPARATUS AND METHOD FOR OPERATING THE SAME

CROSS-REFERENCE TO RELATED APPLICATIONS

This application is the National Phase of PCT/KR2010/009047 filed on Dec. 17, 2010, which claims priority under 35 U.S.C. 119(e) to U.S. Provisional Application No. 61/379,371 filed on Sep. 1, 2010 and under 35 U.S.C. 119(a) to Patent Application No. 10-2010-0086150 filed in the Republic of Korea on Sep. 2, 2010, all of which are hereby expressly incorporated by reference into the present application.

TECHNICAL FIELD

The present invention relates to an image display apparatus and a method for operating the same, and more particularly, to an image display apparatus and a method for operating the same, which increase user convenience.

BACKGROUND ART

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

DISCLOSURE OF INVENTION

Technical Problem

Therefore, the present invention has been made in view of the above problems, and it is an object of the present invention to provide an image display apparatus and a method for operating the same, which can increase user convenience.

It is another object of the present invention to provide an image display apparatus and a method for operating the same, which can provide various user interfaces.

Solution to Problem

In accordance with an aspect of the present invention, the above and other objects can be accomplished by the provision of a method for operating an image display apparatus, including receiving a notification through a network interface or a tuner, generating a promotion card object including the notification by processing the received notification by a card object generator, and displaying the promotion card object on a display.

In accordance with another aspect of the present invention, there is provided a method for operating an image display apparatus, including displaying a home screen including a plurality of card objects on a display, moving at least one of the card objects, and displaying a promotion card object representing a notification on the home screen according to the movement.

In accordance with a further aspect of the present invention, there is provided an image display apparatus, including a tuner for receiving the broadcast image, a network interface for transmitting data to or receiving data from a network, a card object generator for generating a promotion card object including a notification received through the network interface or the tuner by processing the notification, and a display for displaying the promotion card object.

Advantageous Effects of Invention

As is apparent from the above description of the embodiments of the present invention, since a promotion card object including a notification can be displayed on a home screen, a user can readily check the notification.

The promotion card object may be easily displayed through movement of another card object.

Upon selection of a card object name in the promotion card object, the promotion card object is fullscreened. Hence, the user can clearly identify notifications.

Upon selection of a notification in the promotion card object, the selected notification is displayed fullscreen or information linked to the selected notification is displayed. Hence, the user can acquire details of the notification.

Because an image display apparatus provides a variety of UIs, user convenience can be increased.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

An image display apparatus as set forth herein is an intelligent image display apparatus equipped with a computer support function in addition to a broadcast reception function, for example. Thus the image display apparatus may have user-friendly interfaces such as a handwriting input device, a touch screen, or a pointing device. Further, because the image display apparatus supports wired or wireless Internet, it is capable of e-mail transmission/reception, Web browsing, banking, gaming, etc. by connecting to the Internet or a computer. To implement these functions, the image display apparatus may operate based on a standard general-purpose Operating System (OS).

Various applications can be freely added to or deleted from, for example, a general-purpose OS kernel in the image display apparatus according to the present invention. Therefore, the image display apparatus may perform a number of user-friendly functions. The image display apparatus may be a network TV, a Hybrid broadcast broadband TV (HbbTV), a smart TV, etc. for example. The image display apparatus is applicable to a smart phone, as needed.

Embodiments of the present invention will be described in detail with reference to the attached drawings, but it should be understood that they are merely illustrative of the present invention and should not be interpreted as limiting the scope of the present invention.

In addition, although the terms used in the present invention are selected from generally known and used terms, some of the terms mentioned in the description of the present invention, the detailed meanings of which are described in relevant parts of the description herein, have been selected by the applicant at his or her discretion. Furthermore, the present invention must be understood, not simply by the actual terms used but by the meanings of each term lying within.

Figure 1:
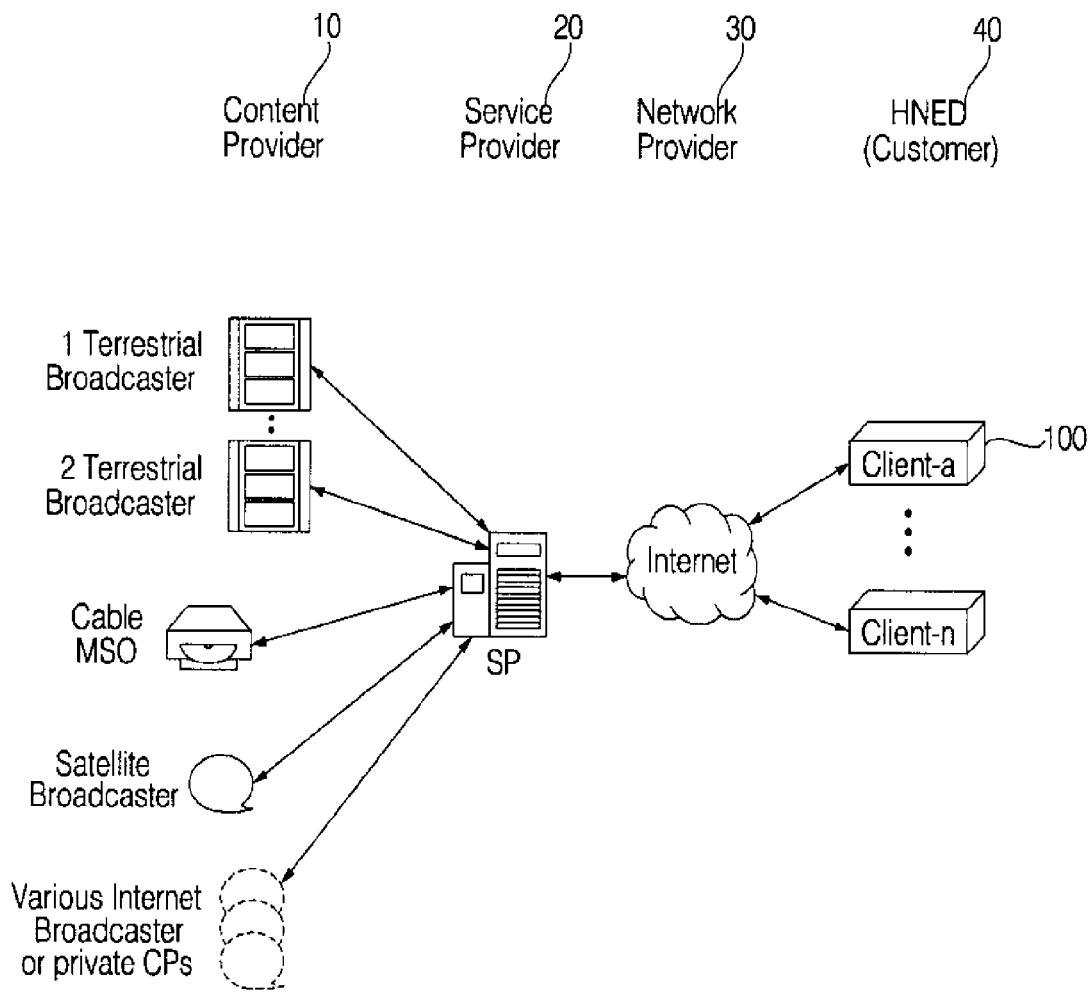
FIG. 1 illustrates the overall configuration of a broadcasting system including an image display apparatus according to an embodiment of the present invention.

FIG. 1 illustrates the overall configuration of a broadcasting system including an image display apparatus according to an embodiment of the present invention.

Referring to FIG. 1, the broadcasting system may include a Content Provider (CP) 10, a Service Provider (SP) 20, a Network Provider (NP) 30, and a Home Network End Device (HNED) 40. The HNED 40 corresponds to, for example, a client 100 which is an image display apparatus according to an embodiment of the present invention. As stated before, the image display apparatus may be a network TV, a smart TV, an Internet Protocol TV (IPTV), etc.

The CP 10 creates and provides content. The CP 10 may be, for example, a terrestrial broadcaster, a cable System Operator (SO) or Multiple System Operator (MSO), a satellite broadcaster, or an Internet broadcaster, as illustrated in FIG. 1.

Besides broadcast content, the CP 10 may provide various applications, which will be described later in detail.

The SP 20 may provide content received from the CP 10 in a service package. For instance, the SP 20 may package first terrestrial broadcasting, second terrestrial broadcasting, cable broadcasting, satellite broadcasting, Internet broadcasting, and applications and provide the package to users.

The SP 20 may unicast or multicast a service to the client 100. Unicast is a form of transmission in which information is sent from only one transmitter to only one receiver. In other words, unicast transmission is point-to-point, involving two nodes only. In an example of unicast transmission, upon receipt of a request for data from a receiver, a server transmits the data to only one receiver. Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service is provided to the client 100. The client 100 may construct a home network and receive a service over the home network.

Content transmitted in the above-described broadcasting system may be protected through conditional access or content protection. CableCard and Downloadable Conditional Access System (DCAS) are examples of conditional access or content protection.

The client 100 may also transmit content over a network. In this case, the client 100 serves as a CP and thus the CP 10 may receive content from the client 100. Therefore, an interactive content service or data service can be provided.

Figure 2:
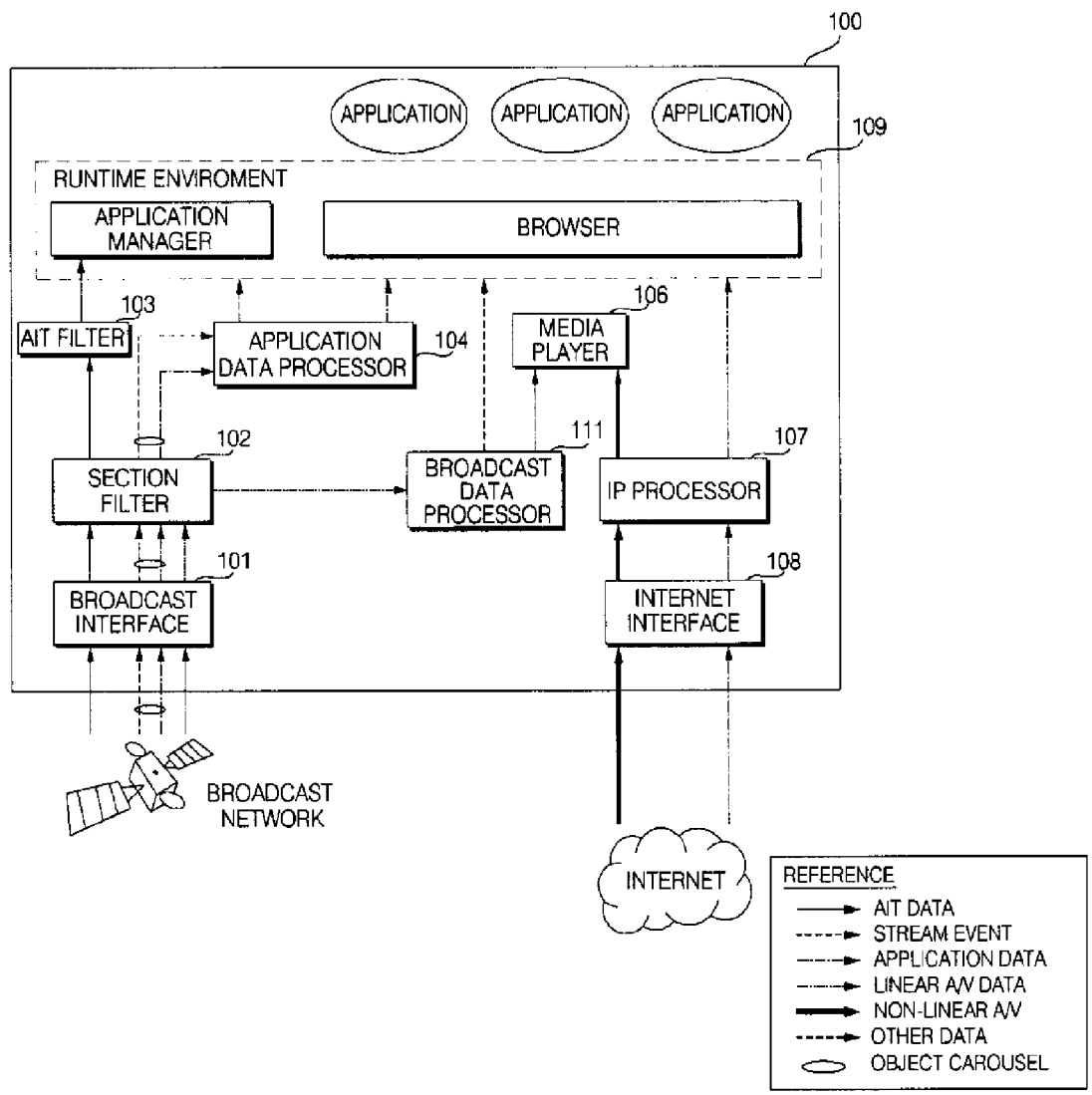
FIG. 2 illustrates the overall configuration of a broadcasting system including an image display apparatus according to another embodiment of the present invention.

FIG. 2 illustrates the overall configuration of a broadcasting system including an image display apparatus according to another embodiment of the present invention.

Referring to FIG. 2, the image display apparatus 100 according to another embodiment of the present invention is connected to a broadcast network and the Internet. The image display apparatus 100 is, for example, a network TV, a smart TV, an HbbTV, etc.

The image display apparatus 100 includes, for example, a broadcast interface 101, a section filter 102, an Application Information Table (AIT) filter 103, an application data processor 104, a broadcast data processor 111, a media player 106, an IP processor 107, an Internet interface 108, and a runtime module 109.

The image display apparatus 100 receives AIT data, real-time broadcast content, application data, and stream events through the broadcast interface 101. The real-time broadcast content may be referred to as linear Audio/Video (A/V) content.

The section filter 102 performs section filtering on the four types of data received through the broadcast interface 101, and outputs the AIT data to the AIT filter 103, the linear A/V content to the broadcast data processor 111, and the stream events and application data to the application data processor 104.

Meanwhile, the image display apparatus 100 receives non-linear A/V content and application data through the Internet interface 108. The non-linear A/V content may be, for example, a Content On Demand (CoD) application.

The non-linear A/V content and the application data are transmitted to the media player 106 and the runtime module 109, respectively.

The runtime module 109 includes, for example, an application manager and a browser as illustrated in FIG. 2. The application manager controls the life cycle of an interactive application using the AIT data, for example. The browser displays and processes the interactive application.

Figure 3:
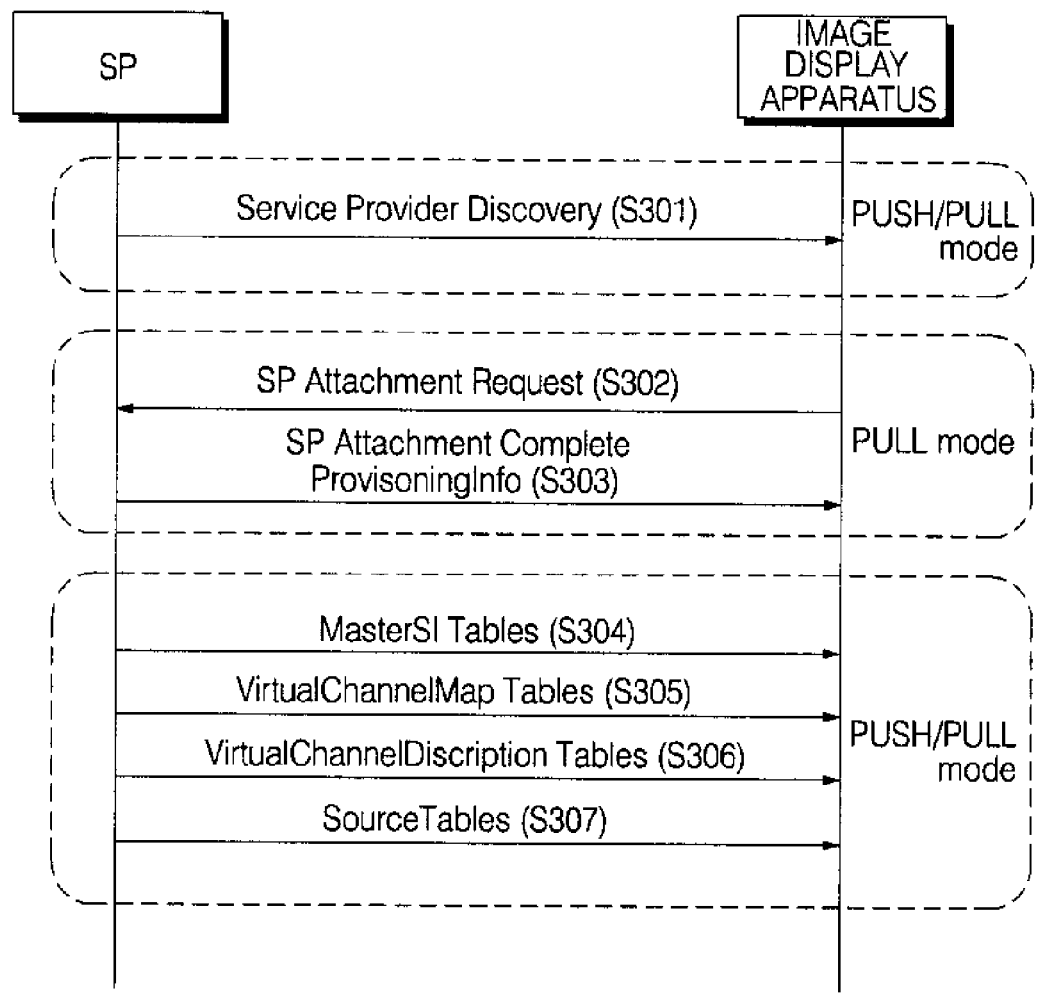
FIG. 3 is a diagram illustrating a signal flow for an operation for attaching to a Service Provider (SP) and receiving channel information from the SP in the image display apparatus illustrated in FIG. 1 or 2 according to an embodiment of the present invention.

FIG. 3 is a diagram illustrating a signal flow for an operation for attaching to an SP and receiving channel information from the SP in the image display apparatus illustrated in FIG. 1 or 2. Needless to say, the operation illustrated in FIG. 3 is an embodiment, which should not be interpreted as limiting the scope of the present invention.

Referring to FIG. 3, an SP performs an SP Discovery operation (S301) and the image display apparatus transmits a Service Provider Attachment Request signal to the SP (S302). Upon completion of attachment to the SP, the image display apparatus receives provisioning information from the SP (S303). Further, the image display apparatus receives Master System Information (SI) Tables, Virtual Channel Map Tables, Virtual Channel Description Tables, and Source Tables from the SP (S304 to S307).

More specifically, SP Discovery is a process by which SPs that provide IPTV services search for Service Discovery (SD) servers having information about the offerings of the SPs.

In order to receive information about the SD servers, an SD server address list can be detected, for example, using three methods, specifically use of an address preset in the image display apparatus or an address manually set by a user, Dynamic Host Configuration Protocol (DHCP)-based SP Discovery, and Domain Name System Service (DNS SRV)-based SP Discovery. The image display apparatus accesses a specific SD server using the SD server address list obtained through one of the above three methods and receives a SP Discovery record from the specific SD server. The Service Provider Discovery record includes information needed to perform Service Discovery on an SP basis. The image display apparatus then starts a Service Discovery operation using the SP Discovery record. These operations can be performed in a push mode or a pull mode.

The image display apparatus accesses an SP attachment server specified by an SP attachment locator included in the SP Discovery record and performs a registration procedure (or a service attachment procedure).

Further, after accessing an authentication service server of an SP specified by an SP authentication locator and performing an authentication procedure, the image display apparatus may perform a service authentication procedure.

After service attachment is successfully performed, a server may transmit data in the form of a provision information table to the image display apparatus.

During service attachment, the image display apparatus may include an Identifier (ID) and location information thereof in data and transmit the data to the service attachment server. Thus the service attachment server may specify a service that the image display apparatus has subscribed to based on the ID and location information. In addition, the service attachment server provides, in the form of a provisioning information table, address information from which the image display apparatus can obtain Service Information (SI). The address information corresponds to access information about a Master SI Table. This method facilitates provision of a customized service to each subscriber.

The SI is divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

Figure 4:
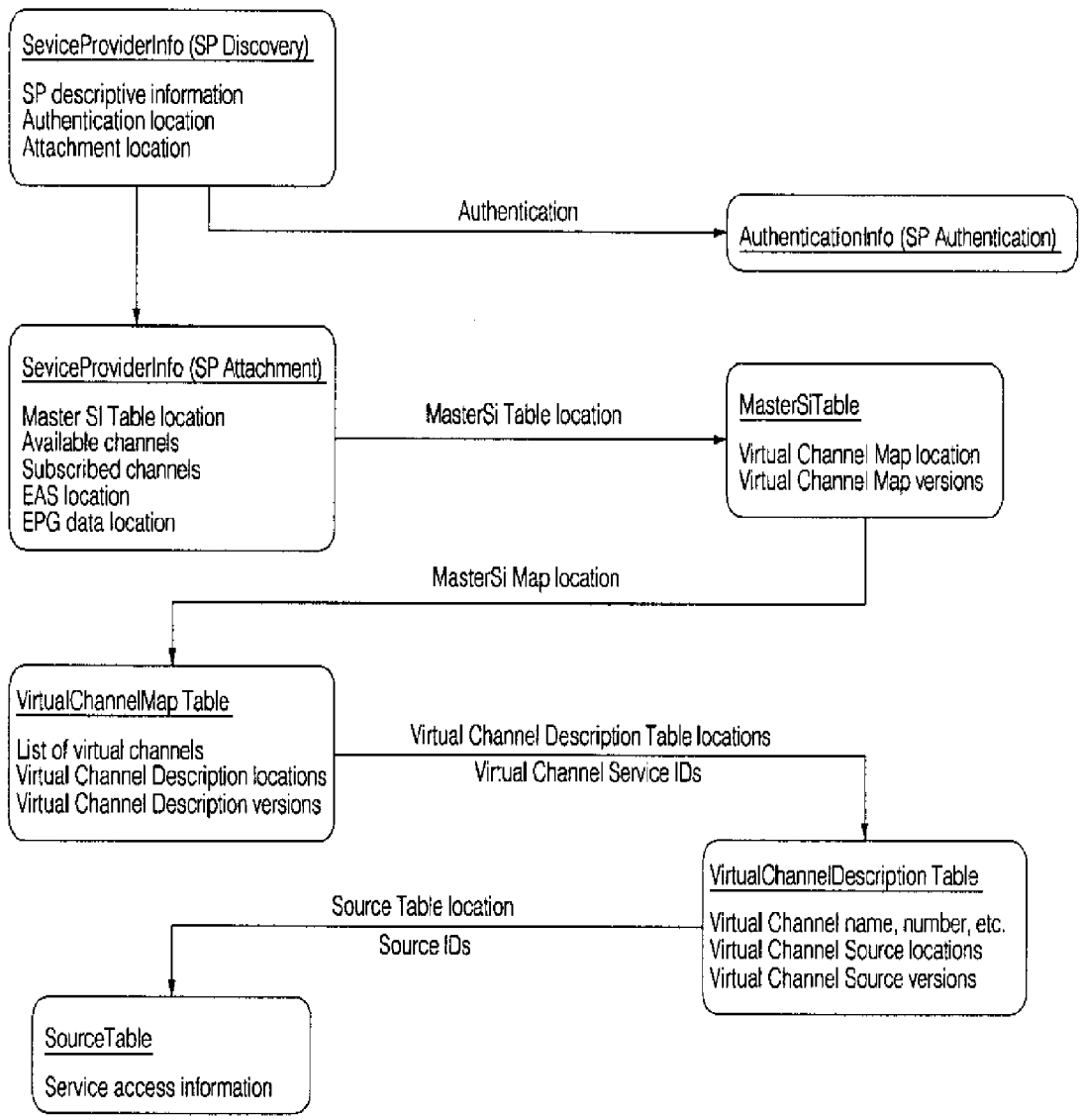
FIG. 4 illustrates an example of data used in the operation illustrated in FIG. 3.

FIG. 4 illustrates an example of data used in the signal flow illustrated in FIG. 3.

FIG. 4 is a detailed diagram of FIG. 3, illustrating a relationship among data in the SI.

Referring to FIG. 4, a Master SI Table contains information about the location and version of each Virtual Channel MAP.

Each Virtual Channel MAP is identified by its Virtual Channel MAP identifier. VirtualChannelMAP Version specifies the version number of the Virtual Channel MAP. If any of the tables connected to the Master SI Table in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. In conclusion, a change in any lower table leads to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a region, subscriber or subscriber group basis. Thus it is possible to provide a customized service to a subscriber according to a region in which the subscriber is located and subscriber information regarding the subscriber.

A Virtual Channel Map Table may contain a list of one or more virtual channels. A Virtual Channel Map includes not details of the channels but information about the locations of the details of the channels. In the Virtual Channel Map Table, VirtualChannelDescriptionLocation specifies the location of a Virtual Channel Description Table that provides virtual channel descriptions.

The Virtual Channel Description Table contains the details of the virtual channels. The Virtual Channel Description Table can be accessed using VirtualChannelDescriptionLocation of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table are delivered in four logically separate flows, in a push mode or a pull mode. For version management, the Master SI Table may be multicast and thus a version change can be monitored by receiving a multicast stream of the Master SI Table.

Figure 5:
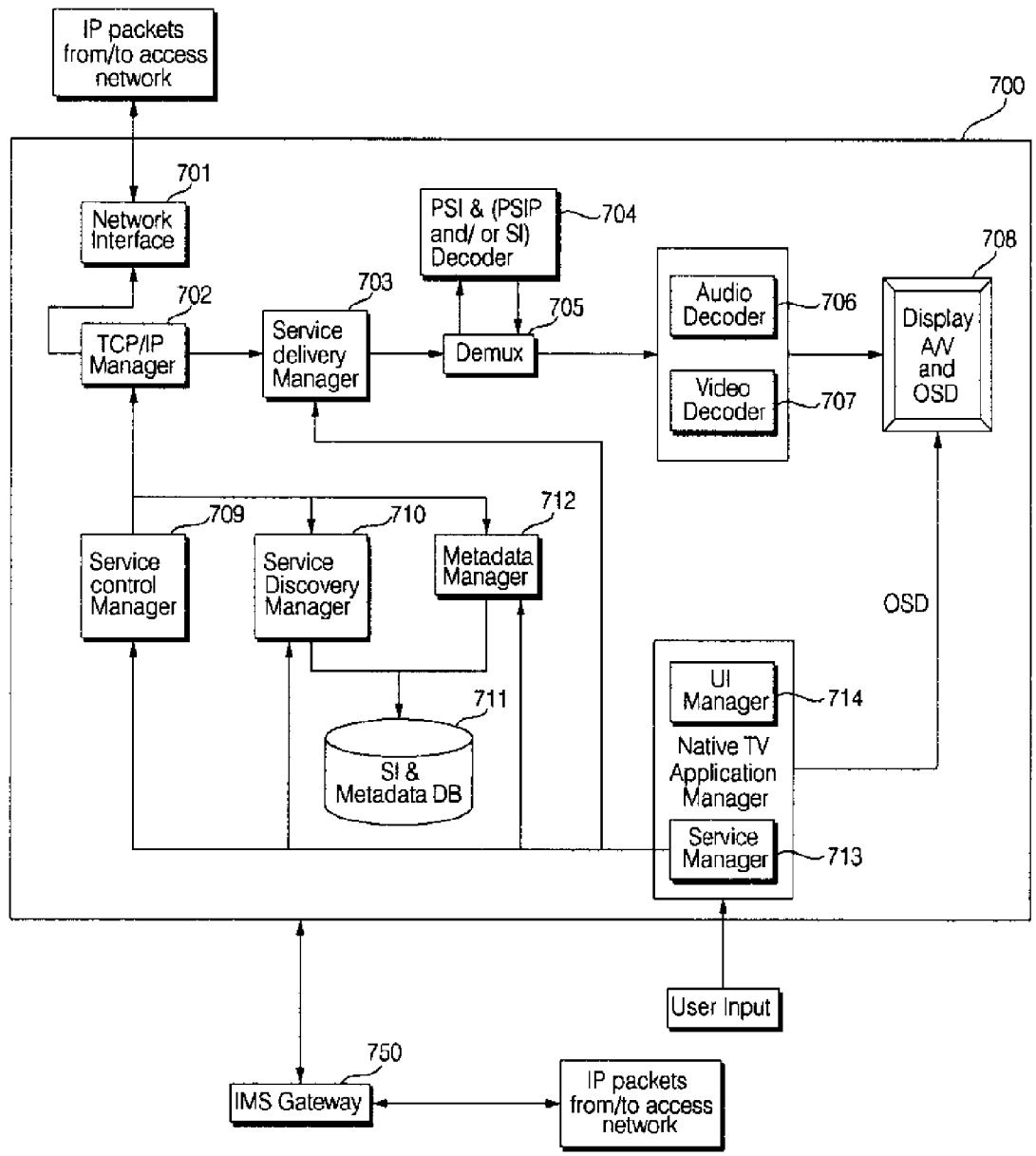
FIG. 5 is a detailed block diagram of the image display apparatus illustrated in FIG. 1 or 2 according to an embodiment of the present invention.

FIG. 5 is a detailed block diagram of the image display apparatus illustrated in FIG. 1 or 2 according to an embodiment of the present invention. The structure of the image display apparatus in FIG. 5 is purely exemplary and should not be interpreted as limiting the scope of the present invention.

Referring to FIG. 5, an image display apparatus 700 includes a network interface 701, a Transmission Control Protocol/Internet Protocol (TCP/IP) manager 702, a service delivery manager 703, a Demultiplexer (DEMUX) 705, a Program Specific Information (PSI) & (Program and System Information Protocol (PSIP) and/or SI) decoder 704, a display A/V and On Screen Display (OSD) module 708, a service control manager 709, a service discovery manager 710, a metadata manager 712, an SI & metadata DataBase (DB) 711, a User Interface (UI) manager 714, and a service manager 713.

The network interface 701 transmits packets to and receives packets from a network. Specifically, the network interface 701 receives services and content from an SP over the network.

The TCP/IP manager 702 is involved in packet reception and transmission of the image display apparatus 700, that is, packet delivery from a source to a destination. The TCP/IP manager 702 classifies received packets according to appropriate protocols and outputs the classified packets to the service delivery manager 705, the service discovery manager 710, the service control manager 709, and the metadata manager 712.

The service delivery manager 703 controls received service data. For example, when controlling real-time streaming data, the service delivery manager 703 may use the Real-time Transport Protocol/Real-time Transport Control Protocol (RTP/RTCP). If real-time streaming data is transmitted over RTP/RTCP, the service delivery manager 703 parses the received real-time streaming data using RTP and outputs the parsed real-time streaming data to the DEMUX 705 or stores the parsed real-time streaming data in the SI & metadata DB 711 under the control of the service manager 713. In addition, the service delivery manager 703 feeds back network reception information to a server that provides the real-time streaming data service using RTCP.

The DEMUX 705 demultiplexes a received packet into audio data, video data and PSI data and outputs the audio data, video data and PSI data to the audio decoder 706, the video decoder 707, and the PSI & (PSIP and/or SI) decoder 704, respectively.

The PSI & (PSIP and/or SI) decoder 704 decodes SI such as PSI. More specifically, the PSI & (PSIP and/or SI) decoder 704 decodes PSI sections, PSIP sections or SI sections received from the DEMUX 705.

The PSI & (PSIP and/or SI) decoder 704 constructs an SI DB by decoding the received sections and stores the SI DB in the SI & metadata DB 711.

The audio decoder 706 and the video decoder 707 decode the audio data and the video data received from the DEMUX 705 and output the decoded audio and video data to a user through the display A/V and OSD module 708.

The UI manager 714 and the service manager 713 manage the overall state of the image display apparatus 700, provide UIs, and manage other managers.

The UI manager 714 provides a Graphical User Interface (GUI) in the form of an OSD and performs a reception operation corresponding to a key input received from the user. For example, upon receipt of a key input signal regarding channel selection from the user, the UI manager 714 transmits the key input signal to the service manager 713.

The service manager 713 controls managers associated with services, such as the service delivery manager 703, the service discovery manager 710, the service control manager 709, and the metadata manager 712.

The service manager 713 also makes a channel map and selects a channel using the channel map according to the key input signal received from the UI manager 714. The service manager 713 sets the audio/video Packet ID (PID) of the selected channel based on SI about the channel received from the PSI & (PSIP and/or SI) decoder 704.

The service discovery manager 710 provides information necessary to select an SP that provides a service. Upon receipt of a channel selection signal from the service manager 713, the service discovery manager 710 detects a service based on the channel selection signal.

The service control manager 709 takes charge of selecting and control services. For example, if a user selects live broadcasting, like a conventional broadcasting service, the service control manager selects and controls the service using Internet Group Management Protocol (IGMP) or Real-Time Streaming Protocol (RTSP). If the user selects Video on Demand (VoD), the service control manager 709 selects and controls the service. RTSP supports trick mode for real-time streaming. Further, the service control manager 709 may initialize and manage a session through an IP Multimedia Control (IMC) gateway using IP Multimedia Subsystem (IMS) and Session Initiation Protocol (SIP). The protocols are given by way of example and thus other protocols are also applicable according to other embodiments.

The metadata manager 712 manages metadata related to services and stores the metadata in the SI & metadata DB 711.

The SI & metadata DB 711 stores the SI decoded by the PSI & (PSIP and/or SI) decoder 704, the metadata managed by the metadata manager 712, and the information required to select an SP, received from the service discovery manager 710. The SI & metadata DB 711 may store setup data for the system.

The SI & metadata DB 711 may be constructed in a Non-Volatile RAM (NVRAM) or a flash memory.

An IMS gateway 705 is a gateway equipped with functions needed to access IMS-based IPTV services.

Figure 6:
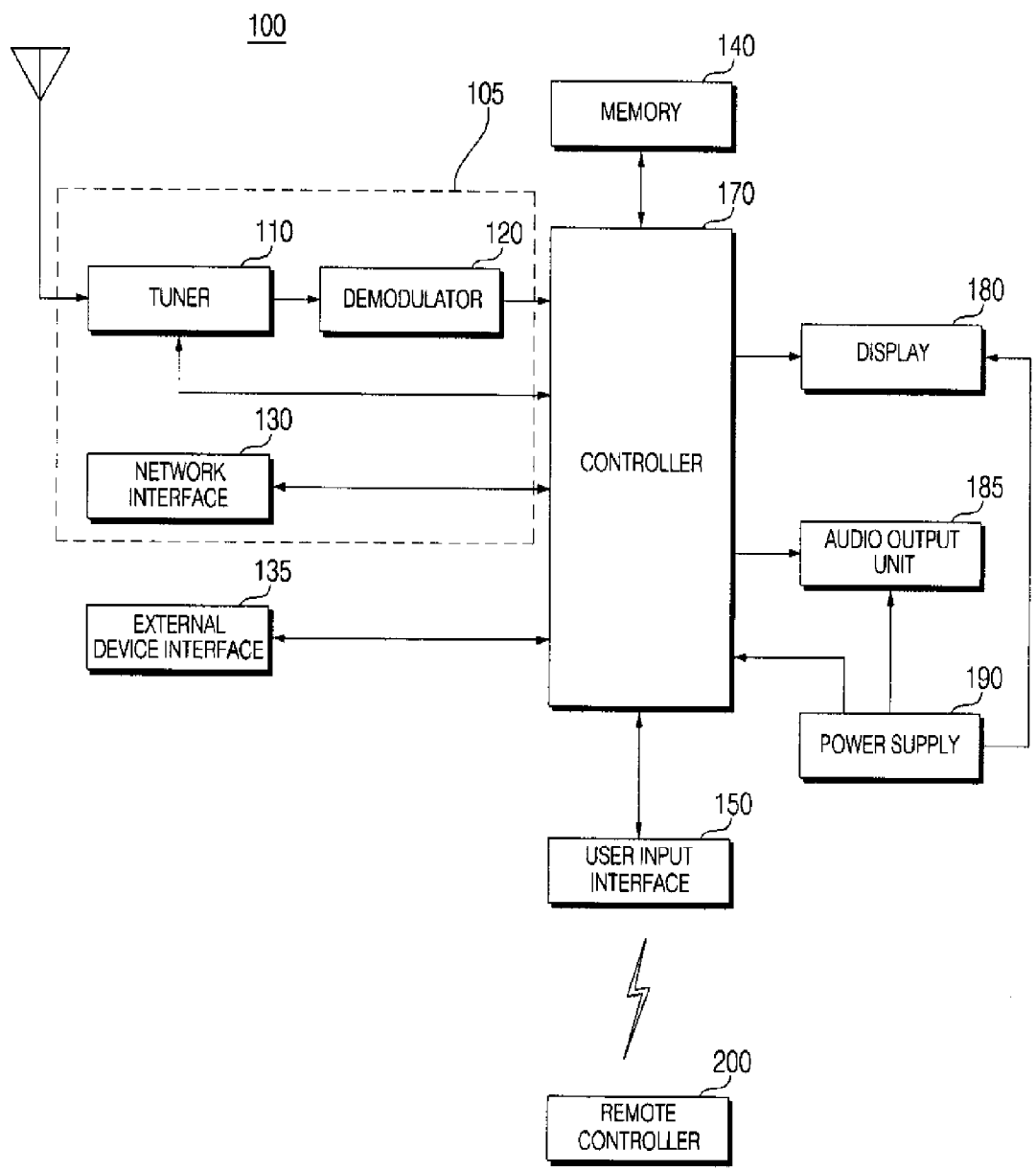
FIG. 6 is a detailed block diagram of the image display apparatus illustrated in FIG. 1 or 2 according to another embodiment of the present invention.

FIG. 6 is a detailed block diagram of the image display apparatus illustrated in FIG. 1 or 2 according to another embodiment of the present invention.

Referring to FIG. 6, an image display apparatus 100 according to another embodiment of the present invention includes a broadcasting receiver 105, an external device interface 135, a memory 140, a user input interface 150, a controller 170, a display 180, an audio output unit 185, a power supply 190, and a camera module (not shown). The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 selects a Radio Frequency (RF) broadcast signal corresponding to a channel selected by a user from among a plurality of RF broadcast signals received through an antenna and downconverts the selected RF broadcast signal into a digital Intermediate Frequency (IF) signal or an analog baseband A/V signal.

More specifically, if the selected RF broadcast signal is a digital broadcast signal, the tuner 110 downconverts the selected RF broadcast signal into a digital IF signal DIF. On the other hand, if the selected RF broadcast signal is an analog broadcast signal, the tuner 110 downconverts the selected RF broadcast signal into an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a stream signal TS. The stream signal TS may be a signal in which a video signal, an audio signal and a data signal are multiplexed. For example, the stream signal TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output unit 185, respectively.

The external device interface 135 may serve as an interface between an external device and the image display apparatus 100. For interfacing, the external device interface 135 may include an A/V Input/Output (I/O) unit (not shown) and/or a wireless communication module (not shown).

The external device interface 135 may be connected to an external device such as a Digital Versatile Disk (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit (not shown) and/or the wireless communication module (not shown).

The A/V I/O unit of the external device interface 135 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA).

The external device interface 135 may be connected to various set-top boxes through at least one of the above-described ports and may thus receive data from or transmit data to the various set-top boxes.

The external device interface 135 may receive applications or an application list from an adjacent external device and provide the applications or the application list to the controller 170 or the memory 140.

The network interface 130 serves as an interface between the image display apparatus 100 and a wired/wireless network such as the Internet. The network interface 130 may include an Ethernet port for connection to a wired network. The wireless communication module of the external signal I/O unit 128 may wirelessly access the Internet. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display apparatus 100 to a user or electronic device selected from among users or electronic devices pre-registered with the image display apparatus 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD files, and broadcast signals, and information related to the content from a CP or an NP. Also, the network interface 130 may receive update information about firmware and update files of the firmware from the NP. The network interface 130 may transmit data over the Internet or to the CP or the NP.

The network interface 130 may selectively receive a desired application among open applications over a network.

In an embodiment of the present invention, when a game application is executed in the image display apparatus 100, the network interface 130 may transmit data to or receive data from a user terminal connected to the image display apparatus 100 through a network. In addition, the network interface 130 may transmit specific data to or receive specific data from a server that records game scores.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel-add function.

The memory 140 may store applications or a list of applications received from the external device interface 135 or the network interface 130.

The memory 140 may store a variety of platforms which will be described later.

In an embodiment of the present invention, when the image display apparatus 100 executes a game application, the memory 140 may store user-specific information and game play information about a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory. The image display apparatus 100 may reproduce content stored in the memory 140 (e.g. video files, still image files, music files, text files, and application files) to the user.

While the memory 140 is shown in FIG. 6 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys (not shown), such as inputs of a power key, a channel key, and a volume key, and setting values.

Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 6, the controller 170 may include a DEMUX and a video processor, which will be described later with reference to FIG. 10.

In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. Especially the controller 170 may access a network and download an application or application list selected by the user to the image display apparatus 100 over the network.

For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display apparatus 100, received broadcast content, and external input content. The content includes at least one of a broadcast image, an external input image, an audio file, a still image, a Web page, or a text file.

Upon receipt of a go-to-home input, the controller 170 may control display of the home screen on the display 180 in an embodiment of the present invention.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display apparatus 100. The card objects may further include at least one of a card object representing a list of connected external devices or a card object representing a call-associated list.

The home screen may further include an application menu with at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The broadcast image may be fixed in size through lock setting.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may fullscreen the selected card object to cover the entirety of the display 180.

Upon receipt of an incoming call at a connected external device or the image display apparatus 100, the controller 170 may control focusing-on or shift of a call-related card object among the plurality of card objects.

If an application view menu item is selected, the controller 170 may control display of applications or a list of applications that are available in the image display apparatus or downloadable from an external network.

The controller 170 may control installation and execution of an application downloaded from the external network along with various UIs. Also, the controller 170 may control display of an image related to the executed application on the display 180, upon user selection.

In an embodiment of the present invention, when the image display apparatus 100 provides a game application, the controller 170 may control assignment of player IDs to specific user terminals, creation of game play information by executing the game application, transmission of the game play information to the user terminals through the network interface 130, and reception of the game play information at the user terminals.

The controller 170 may control detection of user terminals connected to the image display apparatus 100 over a network through the network interface 130, display of a list of the detected user terminals on the display 180 and reception of a selection signal indicating a user terminal selected for use as a user controller from among the listed user terminals through the user input interface 150.

The controller 170 may control output of a game play screen of the game application, inclusive of player information about each user terminal and game play information, through the display 180.

The controller 170 may determine the specific signal received from a user terminal through the network interface 130 as game play information and thus control the game play information to be reflected in the game application in progress.

The controller 170 may control transmission of the game play information about the game application to a specific server connected to the image display apparatus 100 over a network through the network interface 130.

As another embodiment, upon receipt of information about a change in the game play information from the server through the network interface 130, the controller 170 may control output of a notification message in a predetermined area of the display 180.

The image display apparatus 100 may further include a channel browsing processor (not shown) for generating thumbnail images corresponding to channel signals or external input signals.

The channel browsing processor may extract some of the video frames of each of stream signals TS received from the demodulator 120 or stream signals received from the external device interface 135 and display the extracted video frames on the display 180 as thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touch screen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

To sense a user gesture, the image display apparatus 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The image display apparatus 100 may further include the camera unit (not shown) for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the image display apparatus 100. Particularly, the power supply 190 may supply power to the controller 170, the display 180, and the audio output unit 185, which may be implemented as a System On Chip (SOC).

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, UWB and ZigBee.

In addition, the remote controller 200 may receive a video signal, an audio signal or a data signal from the user input interface 150 and output the received signals visually, audibly or as vibrations.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display apparatus 100 illustrated in FIG. 6 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed. In addition, the function of each block is described for the purpose of describing the embodiment of the present invention and thus specific operations or devices should not be construed as limiting the scope and spirit of the present invention.

Unlike the configuration illustrated in FIG. 6, the image display apparatus 100 may be configured so as to receive and playback video content through the network interface 130 or the external device interface 135, without the tuner 100 and the demodulator 120.

The image display apparatus 100 is an example of image signal processing apparatus that processes a stored image or an input image. Other examples of the image signal processing apparatus include a set-top box without the display 180 and the audio output unit 185, a DVD player, a Blu-ray player, a game console, and a computer. The set-top box will be described later with reference to FIGS. 7 and 8.

Figure 7:
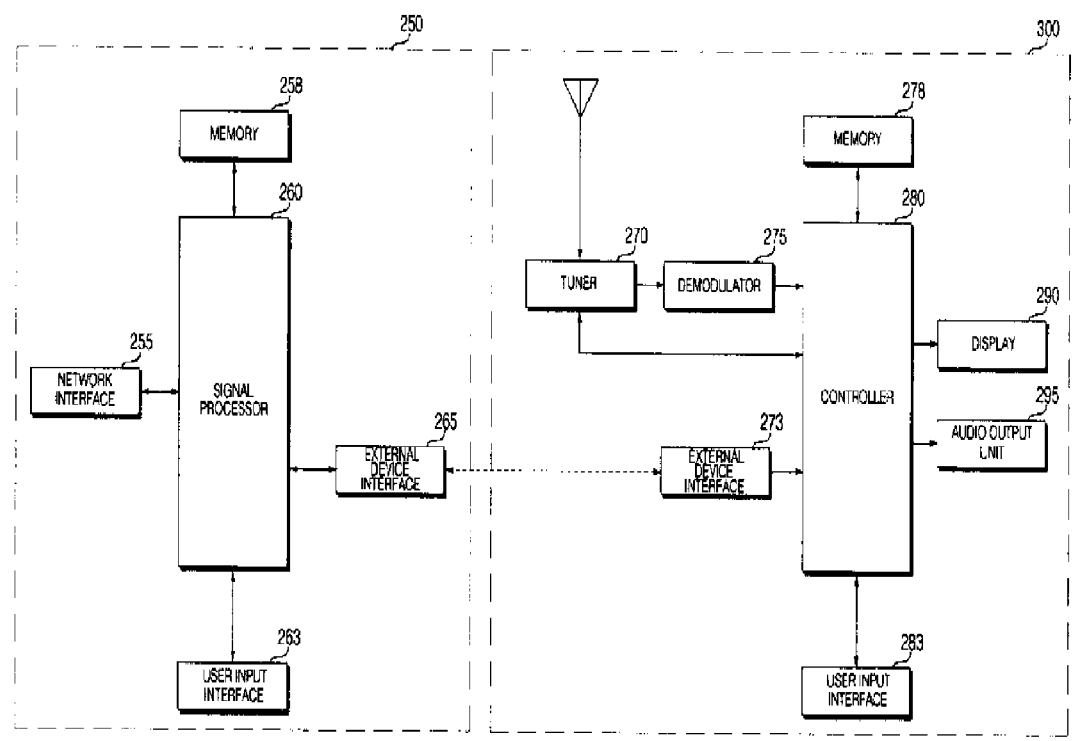
FIGS. 7 and 8 are block diagrams illustrating either of the image display apparatuses separately as a set-top box and a display device according to embodiments of the present invention.
Figure 8:
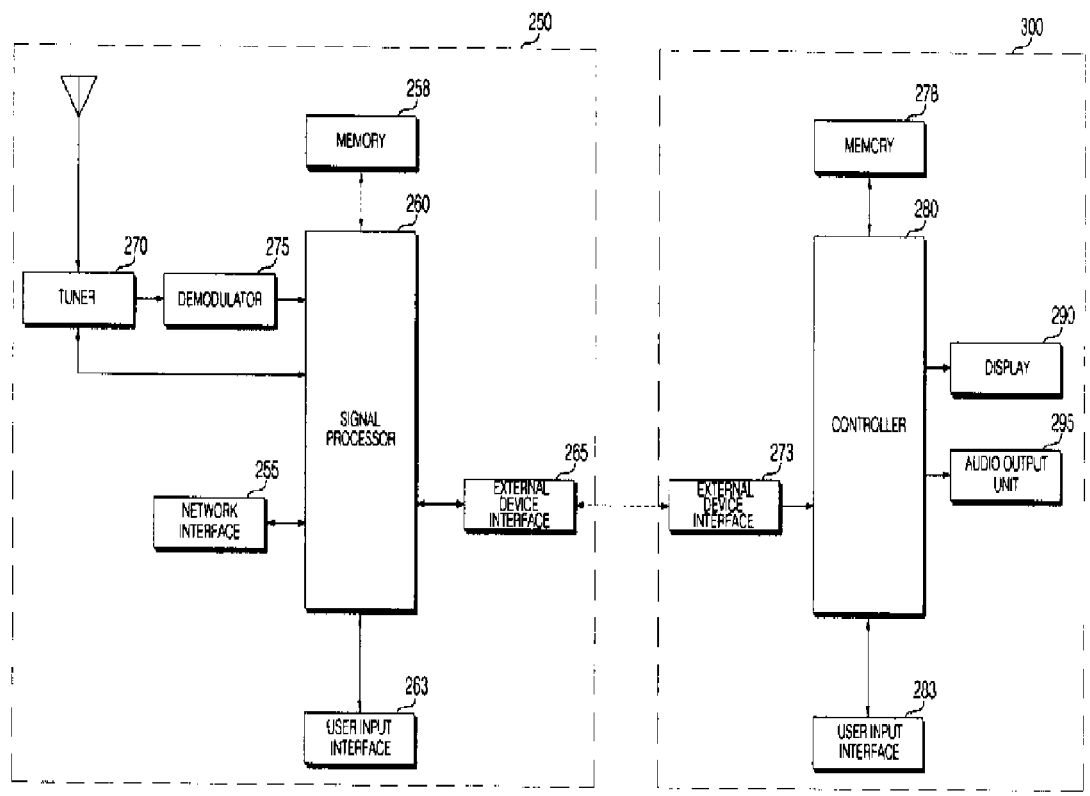

FIGS. 7 and 8 are block diagrams illustrating either of the image display apparatuses separately as a set-top box and a display device according to embodiments of the present invention.

Referring to FIG. 7, a set-top box 250 and a display device 300 may transmit or receive data wirelessly or by wire.

The set-top box 250 may include a network interface 255, a memory 258, a signal processor 260, a user input interface 263, and an external device interface 265.

The network interface 255 serves as an interface between the set-top box 250 and a wired/wireless network such as the Internet. The network interface 255 may transmit data to or receive data from another user or another electronic device over a connected network or over another network linked to the connected network.

The memory 258 may store programs necessary for the signal processor 260 to process and control signals and temporarily store a video, audio and/or data signal received from the external device interface 265 or the network interface 255. The memory 258 may also store platforms illustrated in FIGS. 11 and 12, as described later.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the display device 300 through the external device interface 265.

The user input interface 263 transmits a signal received from the user to the signal processor 260 or a signal received from the signal processor 260 to the user. For example, the user input interface 263 may receive various control signals such as a power on/off signal, an operation input signal, and a setting input signal through a local key (not shown) or the remote controller 200 and output the control signals to the signal processor 260.

The external device interface 265 serves as an interface between the set-top box 250 and an external device that is connected wirelessly or by wire, particularly the display device 300, for signal transmission or reception. The external device interface 265 may also interface with an external device such as a game console, a camera, a camcorder, and a computer (e.g. a laptop computer), for data transmission or reception.

The set-top box 250 may further include a media input unit for media playback. The media input unit may be a Blu-ray input unit, for example. That is, the set-top box 250 may include a Blu-ray player. After signal processing such as demultiplexing or decoding in the signal processor 260, a media signal from a Blu-ray disk may be transmitted to the display device 300 through the external device interface 265 so as to be displayed on the display device 300.

The display device 300 may include a tuner 270, an external device interface 273, a demodulator 275, a memory 278, a controller 280, a user input interface 283, a display 290, and an audio output unit 295.

The tuner 270, the demodulator 275, the memory 278, the controller 280, the user input interface 283, the display 290, and the audio output unit 295 are identical respectively to the tuner 110, the demodulator 120, the memory 140, the controller 170, the user input interface 150, the display 180, and the audio output unit 185 illustrated in FIG. 6 and thus a description thereof is not provided herein.

The external device interface 273 serves as an interface between the display device 300 and a wireless or wired external device, particularly the set-top box 250, for data transmission or reception.

Hence, a video signal or an audio signal received through the set-top box 250 is output through the display 290 or the audio output unit 295 through the controller 280.

Referring to FIG. 8, the configuration of the set-top box 250 and the display device 300 illustrated in FIG. 8 is similar to that of the set-top box 250 and the display device 300 illustrated in FIG. 7, except that the tuner 270 and the demodulator 275 reside in the set-top box 250, not in the display device 300. Thus the following description is given focusing on such difference.

The signal processor 260 may process a broadcast signal received through the tuner 270 and the demodulator 275. The user input interface 263 may receive a channel selection input, a channel store input, etc.

Figure 9:
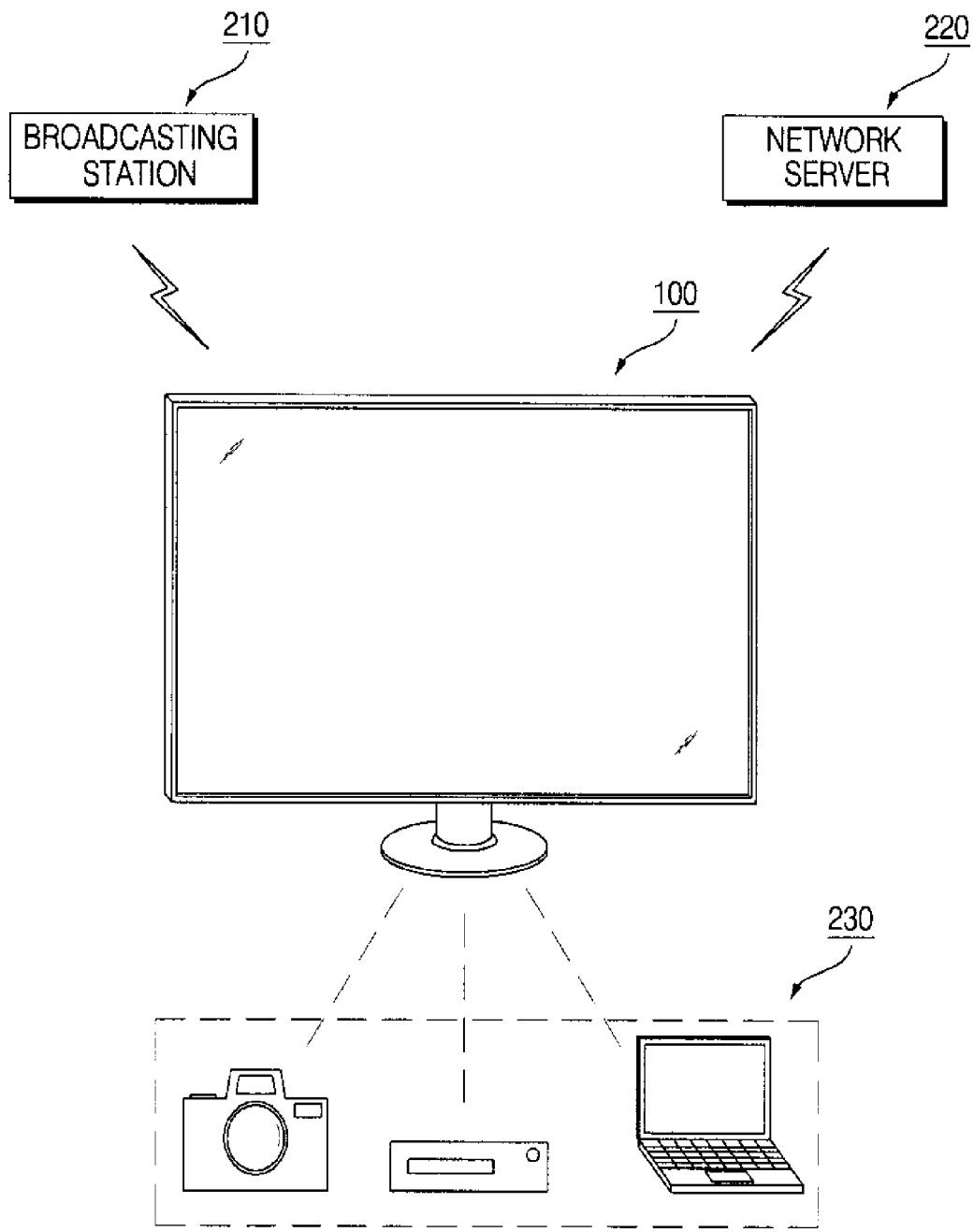
FIG. 9 illustrates an operation for communicating with third devices in either of the image display apparatuses according to an embodiment of the present invention.

FIG. 9 illustrates an operation for communicating with third devices in either of the image display apparatuses according to an embodiment of the present invention. The image display apparatus illustrated in FIG. 9 may be one of the afore-described image display apparatuses according to the embodiments of the present invention.

Referring to FIG. 9, the image display apparatus 100 may communicate with a broadcasting station 210, a network server 220, or an external device 230.

The image display apparatus 100 may receive a broadcast signal including a video signal from the broadcasting station 210. The image display apparatus 100 may process the audio and video signals of the broadcast signal or the data signal of the broadcast signal, suitably for transmission from the image display apparatus 100. The image display apparatus 100 may output images or sound based on the processed video or audio signal.

Meanwhile, the image display apparatus 100 may communicate with the network server 220. The network server 200 is capable of transmitting signals to and receiving signals from the image display apparatus 100 over a network. For example, the network server 220 may be a portable terminal that can be connected to the image display apparatus 100 through a wired or wireless base station. In addition, the network server 200 may provide content to the image display apparatus 100 over the Internet. A CP may provide content to the image display apparatus 100 through the network server 220.

The image display apparatus 100 may communicate with the external device 230. The external device 230 can transmit and receive signals directly to and from the image display apparatus 100 wirelessly or by wire. For instance, the external device 230 may be a media memory device or a player. That is, the external device 230 may be any of a camera, a DVD player, a Blu-ray player, a PC, etc.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230 and may transmit a signal received from the external device 230 to the broadcasting station 210 or the network server 220. That is, the image display apparatus 100 may transmit content included in signals received from the broadcasting station 210, the network server 220, and the external device 230, as well as playback the content immediately.

Figure 10:
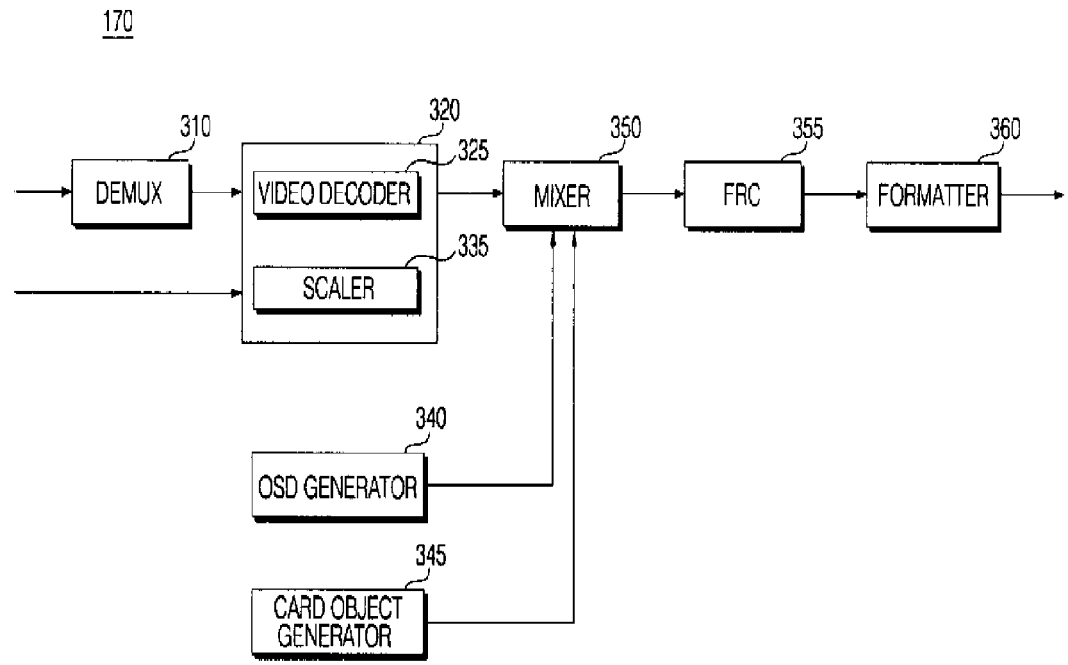
FIG. 10 is a block diagram of a controller illustrated in FIG. 6.

FIG. 10 is a block diagram of the controller illustrated in FIG. 6.

Referring to FIG. 10, the controller 170 may include a DEMUX 310, a video processor 320, an OSD generator 340, a card object generator 345, a mixer 350, a Frame Rate Converter (FRC) 355, and a formatter 360 according to an embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

If the demultiplexed video signal is, for example, an MPEC-2 encoded video signal, the video signal may be decoded by an MPEC-2 decoder.

On the other hand, if the video signal is an H.264-encoded DMB or DVB-handheld (DVB-H) signal, the video signal may be decoded by an H.264 decoder.

The video signal decoded by the video processor 320 is provided to the mixer 350.

The OSD generator 340 generates an OSD signal autonomously or according to user input. For example, the OSD generator 340 may generate signals by which a variety of information is displayed as images or text on the display 180, according to control signals received from the user input interface 150. The OSD signal may include various data such as a UI, a variety of menu screens, widgets, icons, etc.

For example, the OSD generator 340 may generate a signal by which subtitles are displayed for a broadcast image or Electronic Program Guide (EPG)-based broadcasting information.

The card object generator 345 may generate a plurality of card objects displayed on the home screen according to go-to-home input. The card object generator 345 may be included in the controller 170. While not shown in FIG. 10, the card object generator 345 may be included in the OSD generator 340 of the controller 170 or may be configured as a separate GPU. The plurality of card objects generated from the card object generator may be transmitted to and displayed on the display 180.

The mixer 350 may mix the decoded video signal with the OSD signal and output the mixed signal to the formatter 360. As the decoded broadcast video signal or the external input signal is mixed with the OSD signal, an OSD may be overlaid on the broadcast image or the external input image.

The FRC 355 may change the frame rate of an input image. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 360 changes the format of the signal received from the FRC 355 to be suitable for the display 180. For example, the formatter 360 may convert a received signal into an RGB data signal. The RGB signal may be output in the form of a Low Voltage Differential Signal (LVDS) or mini-LVDS.

The audio processor (not shown) of the controller 170 may process the demultiplexed audio signal. For audio signal processing, the audio processor may have a plurality of decoders.

If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor of the controller 170 may also adjust the bass, treble or volume of the audio signal.

The data processor (not shown) of the controller 170 may process the data signal obtained by demultiplexing the input stream signal. For example, if the data signal is an encoded signal such as an EPG which includes broadcasting information specifying the start time, end time, etc. of scheduled broadcast TV or radio programs, the controller 170 may decode the data signal. Examples of an EPG include ATSC-Program and System Information Protocol (PSIP) information and DVB-Service Information (SI).

ATSC-PSIP information or DVB-SI may be included in the header of a TS, i.e., a 4-byte header of an MPEG-2 TS.

The block diagram of the controller 170 illustrated in FIG. 10 is an embodiment of the present invention. Depending upon the specifications of the controller 170, the components of the controller 170 may be combined, or omitted. Or new components are added to the controller 170.

Figure 11:
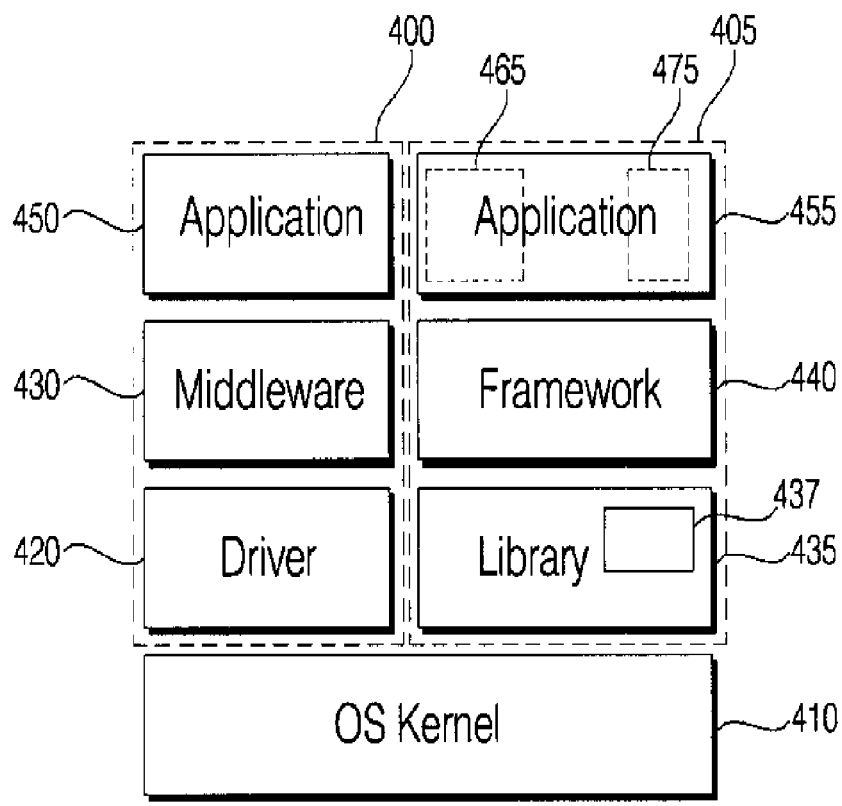
FIG. 11 illustrates a platform architecture for either of the image display apparatuses according to an embodiment of the present invention.
Figure 12:
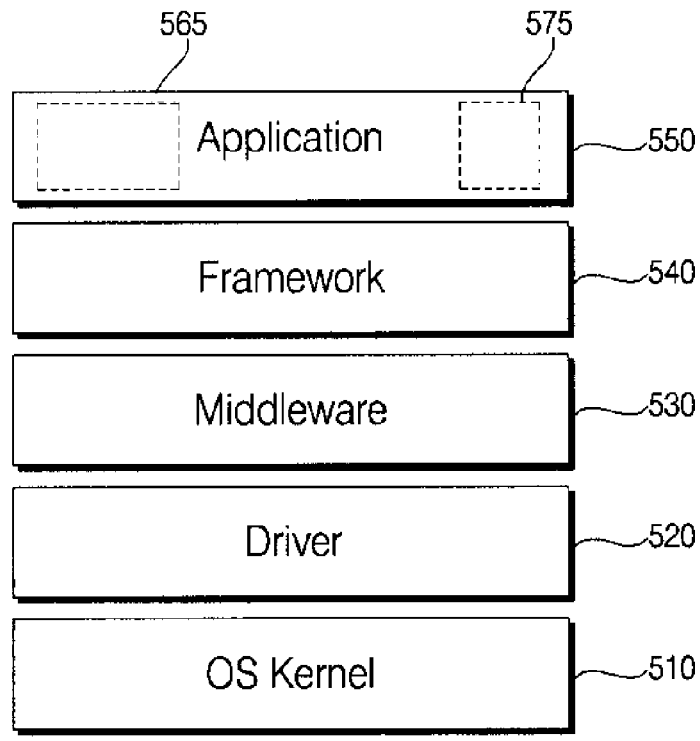
FIG. 12 illustrates a platform architecture for either of the image display apparatuses according to another embodiment of the present invention.

FIG. 11 illustrates a platform architecture for either of the image display apparatuses according to an embodiment of the present invention and FIG. 12 illustrates a platform architecture for either of the image display apparatuses according to another embodiment of the present invention.

A platform for either of the image display apparatuses may have OS-based software to implement the above-described various operations according to an embodiment of the present invention.

Referring to FIG. 11, a platform for either of the image display apparatuses is a separate type according to an embodiment of the present invention. The platform may be designed separately as a legacy system platform 400 and a smart system platform 405. An OS kernel 410 may be shared between the legacy system platform 400 and the smart system platform 405.

The legacy system platform 400 may include a stack of a driver 420, middleware 430, and an application layer 450 on the OS kernel 410.

On the other hand, the smart system platform 405 may include a stack of a library 435, a framework 440, and an application layer 455 on the OS kernel 410.

The OS kernel 410 is the core of an operating system. When the image display apparatus is driven, the OS kernel 410 may be responsible for operation of at least one of hardware drivers, security protection for hardware and processors in the image display apparatus, efficient management of system resources, memory management, hardware interfacing by hardware abstraction, multi-processing, or scheduling associated with the multi-processing. Meanwhile, the OS kernel 410 may further perform power management.

The hardware drivers of the OS kernel 410 may include, for example, at least one of a display driver, a Wi-Fi driver, a Bluetooth driver, a USB driver, an audio driver, a power manager, a binder driver, or a memory driver.

Alternatively or additionally, the hardware drivers of the OS kernel 410 may be drivers for hardware devices within the OS kernel 410. The hardware drivers may include a character device driver, a block device driver, and a network device driver. The block device driver may need a buffer for buffering data on a block basis, because data is transmitted on a block basis. The character device driver may not need a buffer since data is transmitted on a basic data unit basis, that is, on a character basis.

The OS kernel 410 may be implemented based on any of various OSs such as Unix (Linux), Windows, etc. The OS kernel 410 may be a general-purpose open OS kernel which can be implemented in other electronic devices.

The driver 420 is interposed between the OS kernel 410 and the middleware 430. Along with the middleware 430, the driver 420 drives devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 410.

In addition, the driver 420 may further include a driver for the remote controller 200, especially a pointing device to be described below. The remote controller driver may reside in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 450 that runs atop the middleware 430 in the legacy system platform 400 may include, for example, UI applications associated with various menus in the image display apparatus. The application layer 450 may allow editing and updating over a network by user selection. With use of the application layer 450, the user may enter a desired menu among various UIs by manipulating the remote controller 210 while viewing a broadcast program.

The application layer 450 may further include at least one of a TV guide application, a Bluetooth application, a reservation application, a Digital Video Recorder (DVR) application, and a hotkey application.

In the smart system platform 405, the library 435 is positioned between the OS kernel 410 and the framework 440, forming the basis of the framework 440. For example, the library 435 may include Secure Socket Layer (SSL) being a security-related library, WebKit being a Web engine-related library, c library (libc), and Media Framework being a media-related library specifying, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver (not shown) of the OS kernel 410 may operate.

The binder driver and the runtime 437 may connect Java applications to C-based libraries.

The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include supporting programs and programs for interconnecting different software components. For example, the framework 440 may include an activity manager related to activities of applications, a notification manager, and a CP for abstracting common information between applications. This framework 440 may be written in Java.

The application layer 455 on top of the framework 440 includes a variety of programs that are executed and displayed in the image display apparatus. The application layer 455 may include, for example, a core application that is a suit having at least one solution of e-mail, Short Message Service (SMS), calendar, map, or browser. The application layer 455 may be written in Java.

In the application layer 455, applications may be categorized into user-undeletable applications 465 stored in the image display apparatus 100 that cannot be modified and user-installable or user-deletable applications 475 that are downloaded from an external device or a network and stored in the image display apparatus.

With the applications of the application layer 455, a variety of functions such as Internet telephony, VoD, Web album, Social Networking Service (SNS), Location-Based Service (LBS), map service, Web browsing, and application search may be performed through network access. In addition, other functions such as gaming and schedule management may be performed by the applications.

Referring to FIG. 12, a platform for the image display apparatus according to another embodiment of the present invention is an integrated type. The integrated platform may include an OS kernel 510, a driver 520, middleware 530, a framework 540, and an application layer 550.

Compared to the separate-type platform illustrated in FIG. 11, the integrated-type platform is characterized by the absence of the library 435 and the application layer 550 being an integrated layer. The driver 520 and the framework 540 correspond to the driver 420 and the framework 440 of FIG. 5, respectively.

The library 435 of FIG. 11 may be incorporated into the middleware 530. That is, the middleware 530 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, whereas the image display system middleware includes SSL as a security-related library, WebKit as a Web engine-related library, libc, and Media Framework as a media-related library. The middleware 530 may further include the afore-described runtime.

The application layer 550 may include a menu-related application, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus and user-installable or user-deletable applications 575 that are downloaded from an external device or a network and stored in the image display apparatus.

Based on the afore-described platforms illustrated in FIGS. 11 and 12, a variety of Application Programming Interfaces (APIs) and Software Development Kits (SDKs) necessary to develop applications may be opened. APIs may be implemented functions that provide connectivity to specific subroutines, for execution of the functions within a program. Or APIs may be implemented programs.

For example, sources related to hardware drivers of the OS kernel 410, such as a display driver, a WiFi driver, a Bluetooth driver, a USB driver or an audio driver, may be opened. Related sources within the driver 420 such as a driver for a microcomputer, a display module, a GPU, an FRC, an SDEC, a VDEC, an ADEC or a pointing device may be opened. In addition, sources related to PSIP or SI middleware as broadcasting information-related middleware or sources related to DLNA middleware may be opened.

Such various open APIs allow developers to create applications executable in the image display apparatus 100 or applications required to control operations of the image display apparatus 100 based on the platforms illustrated in FIGS. 11 and 12.

The platforms illustrated in FIGS. 11 and 12 may be general-purpose ones that can be implemented in many other electronic devices as well as in image display apparatuses. The platforms may be stored or loaded in the memory 140, the controller 170, or any other processor (not shown). To execute applications, an additional application processor (not shown) may be further provided.

Figure 13:
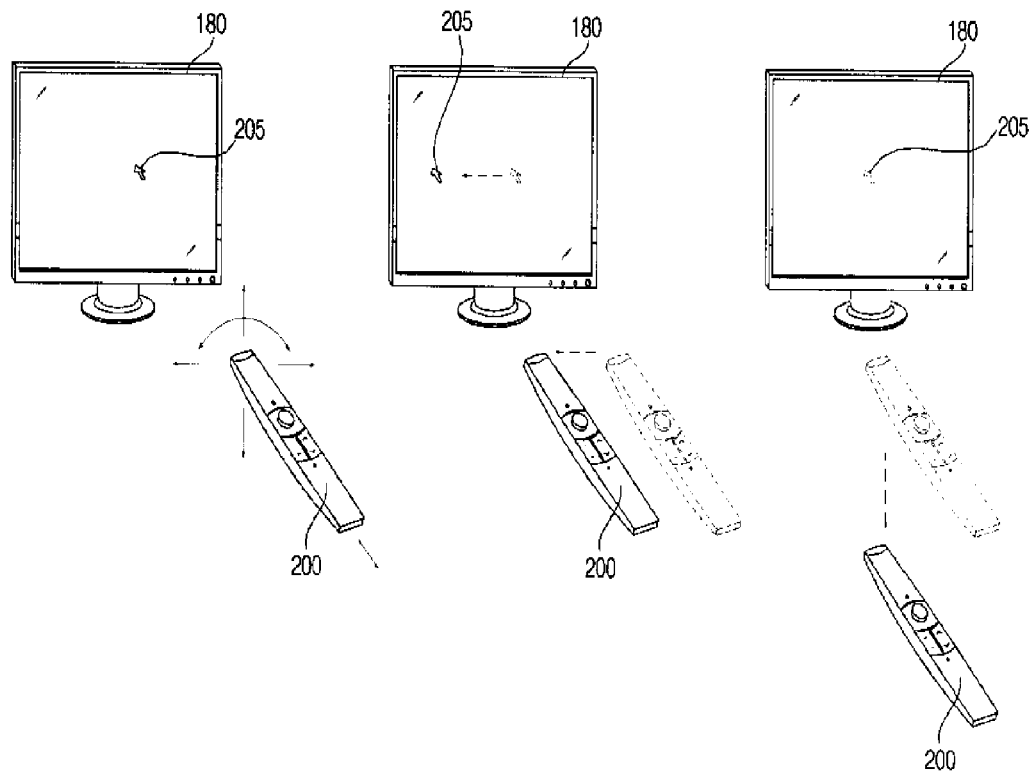
FIG. 13 illustrates a method for controlling either of the image display apparatuses in a remote controller according to an embodiment of the present invention.

FIG. 13 illustrates a method for controlling either of the image display apparatuses using a remote controller according to an embodiment of the present invention.

FIG. 13(a) illustrates a pointer 205 representing movement of the remote controller 200 displayed on the display 180.

The user may move or rotate the remote controller 200 up and down, side to side (FIG. 13(b)), and back and forth (FIG. 13(c)). Since the pointer 205 moves in accordance with the movement of the remote controller 200, the remote controller 200 may be referred to as a pointing device.

Referring to FIG. 13(b), if the user moves the remote controller 200 to the left, the pointer 205 moves to the left on the display 180. A sensor of the remote controller 200 detects the movement of the remote controller 200 and transmits motion information corresponding to the result of the detection to the image display apparatus. Then, the image display apparatus determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus then displays the pointer 205 at the calculated coordinates.

Referring to FIG. 13(c), while pressing a predetermined button of the remote controller 200, the user moves the remote controller 200 away from the display 180. Then, a selected area corresponding to the pointer 205 may be zoomed in on and enlarged on the display 180. On the contrary, if the user moves the remote controller 200 toward the display 180, the selection area corresponding to the pointer 205 is zoomed out and thus contracted on the display 180. The opposite case is possible. That is, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

The pointer 205 is an object displayed on the display 180 in correspondence with the movement of the remote controller 200. Therefore, the pointer 205 may have various shapes other than the arrow illustrated in FIG. 13. For example, the pointer 205 may be a dot, a cursor, a prompt, a thick outline, etc. The pointer 205 may be displayed across a plurality of points, such as a line and a surface, as well as at a single point on horizontal and vertical axes.

Figure 14:
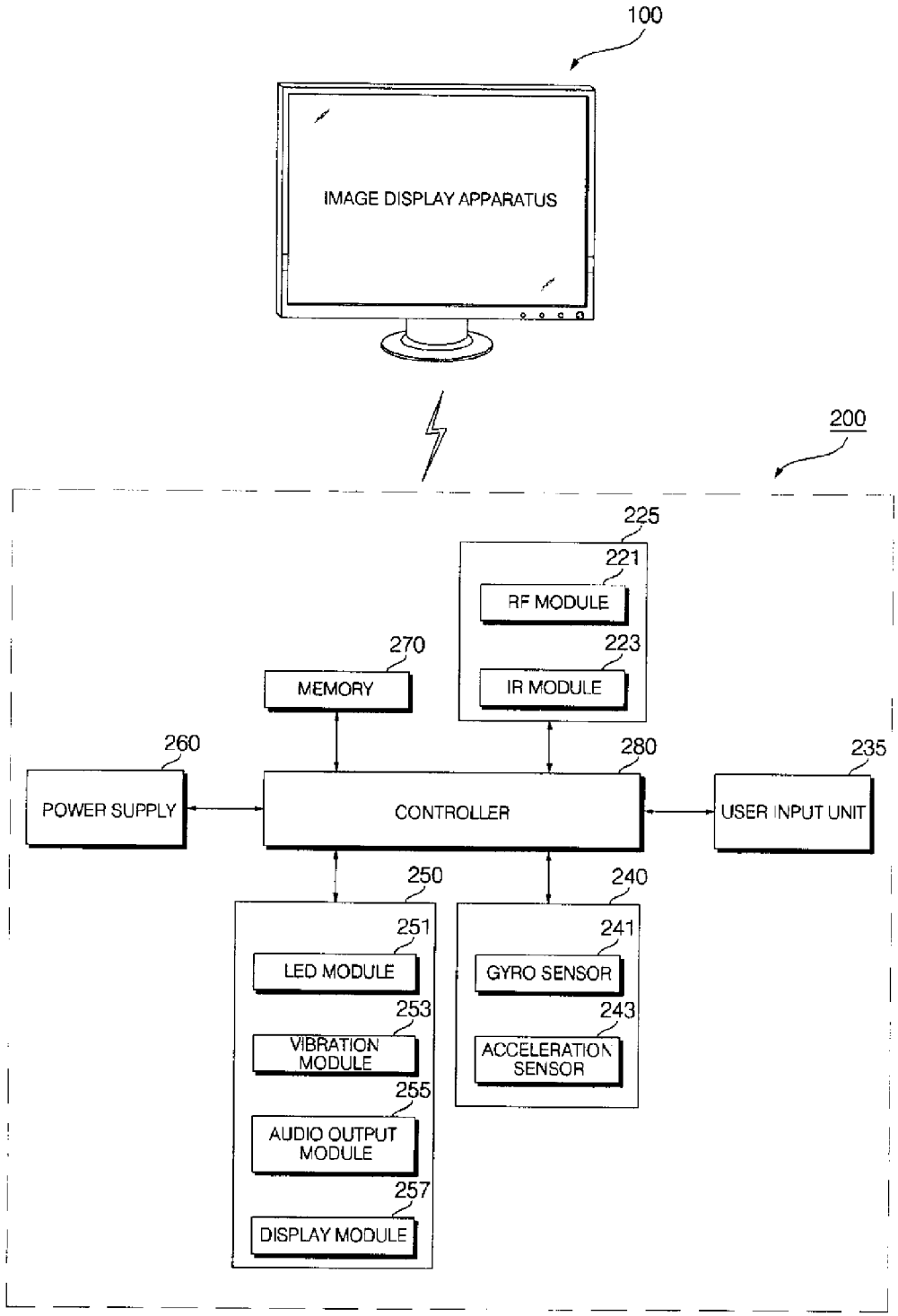
FIG. 14 is a detailed block diagram of the remote controller in either of the image display apparatuses according to an embodiment of the present invention.

FIG. 14 is a detailed block diagram of the remote controller in either of the image display apparatuses according to an embodiment of the present invention.

Referring to FIG. 14, the remote controller 200 may include a wireless communication module 225, a user input unit 235, a sensor unit 240, an output unit 250, a power supply 260, a memory 270, and a controller 280.

The wireless communication module 225 transmits signals to and/or receives signals from either of the afore-described image display apparatuses according to the embodiments of the present invention, herein, the image display apparatus 100.

The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

The remote controller 200 transmits motion information representing the movement of the remote controller 200 to the image display apparatus 100 through the RF module 221 in this embodiment. The remote controller 200 may also receive signals from the image display apparatus 100 through the RF module 221. As needed, the remote controller 200 may transmit commands such as a power on/off command, a channel switch command, or a volume change command to the image display apparatus 100 through the IR module 223.

The user input unit 235 may include a keypad, a plurality of buttons, a touchpad and/or a touch screen. The user may enter commands to the image display apparatus 100 by manipulating the user input unit 235. If the user input unit 235 includes a plurality of hard buttons, the user may input various commands to the image display apparatus 100 by pressing the hard buttons. Alternatively or additionally, if the user input unit 235 includes a touch screen displaying a plurality of soft keys, the user may input various commands to the image display apparatus 100 by touching the soft keys. The user input unit 235 may also include various input tools other than those set forth herein, such as a scroll key and/or a jog wheel, which should not be construed as limiting the present invention.

The sensor unit 240 may include a gyro sensor 241 and/or an acceleration sensor 243. The gyro sensor 241 may sense the movement of the remote controller 200, for example, in X-, Y-, and Z-axis directions, and the acceleration sensor 243 may sense the speed of the remote controller 200. The sensor unit 240 may further include a distance sensor for sensing the distance between the remote controller 200 and the display 180.

The output unit 250 may output a video and/or audio signal corresponding to manipulation of the user input unit 235 or corresponding to a signal received from the image display apparatus 100. The user may easily identify whether the user input unit 235 has been manipulated or whether the image display apparatus 100 has been controlled, based on the video and/or audio signal output by the output unit 250.

The output unit 250 may include a Light Emitting Diode (LED) module 351 which is turned on or off whenever the user input unit 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 is kept stationary for a predetermined time or longer, the power supply 260 may, for example, reduce or shut off supply of power to the spatial remote controller 200 in order to save power. The power supply 260 may resume power supply if a predetermined key on the spatial remote controller 200 is manipulated.

The memory 270 may store various types of programs and application data necessary to control or drive the remote controller 200. The spatial remote controller 200 may wirelessly transmit signals to and/or receive signals from the image display apparatus 100 over a predetermined frequency band with the aid of the RF module 221. The controller 280 of the remote controller 200 may store information regarding the frequency band used for the remote controller 200 to wirelessly transmit signals to and/or wirelessly receive signals from the paired image display apparatus 100 in the memory 270, for later use.

The controller 280 provides overall control to the remote controller 200. The controller 280 may transmit a signal corresponding to a key manipulation detected from the user input unit 235 or a signal corresponding to motion of the spatial remote controller 200, as sensed by the sensor unit 240, to the image display apparatus 100.

FIGS. 15 to 18 illustrate UIs in either of the image display apparatuses according to embodiments of the present invention.

Figure 15:
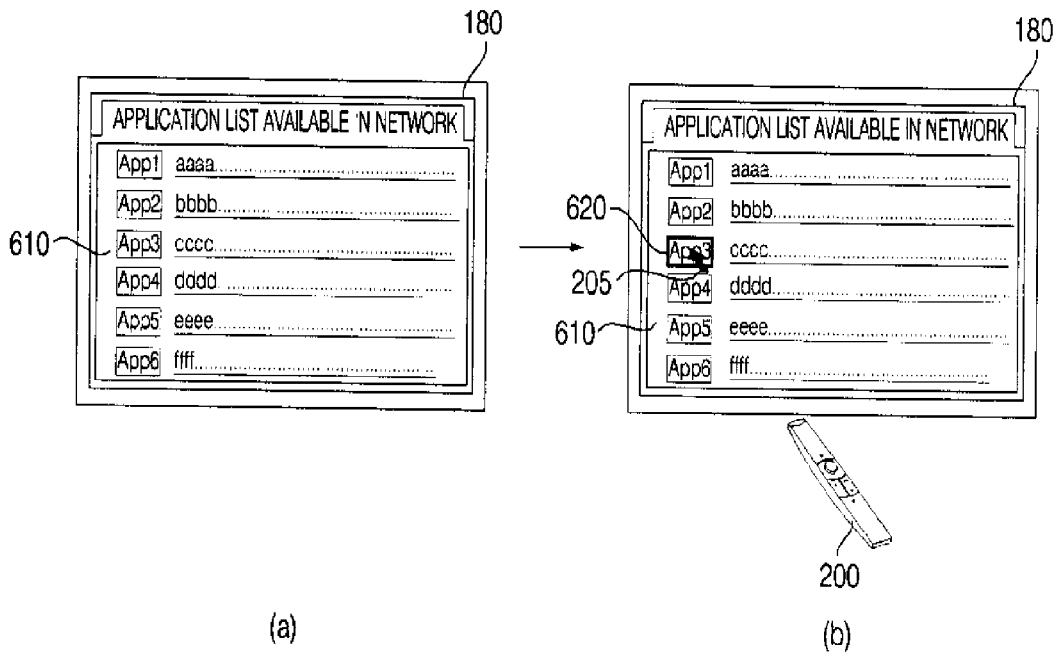
FIG. 15 illustrates a UI in either of the image display apparatuses according to an embodiment of the present invention.

Referring to FIG. 15, an application list available from a network is displayed on the display 180. A user may access a CP or an NP directly, search for various applications, and download the applications from the CP or the NP.

Specifically, FIG. 15(a) illustrates an application list 610 available in a connected server, displayed on the display 180. The application list 610 may include an icon representing each application and a brief description of the application. Because each of the image display apparatuses according to the embodiments of the present invention is capable of full browsing, it may enlarge the icons or descriptions of applications received from the connected server on the display 180. Accordingly, the user can readily identify applications, which will be described later.

FIG. 15(b) illustrates selection of one application 620 from the application list 610 using the pointer 205 of the remote controller 200. Thus, the selected application 620 may be easily downloaded.

Figure 16:
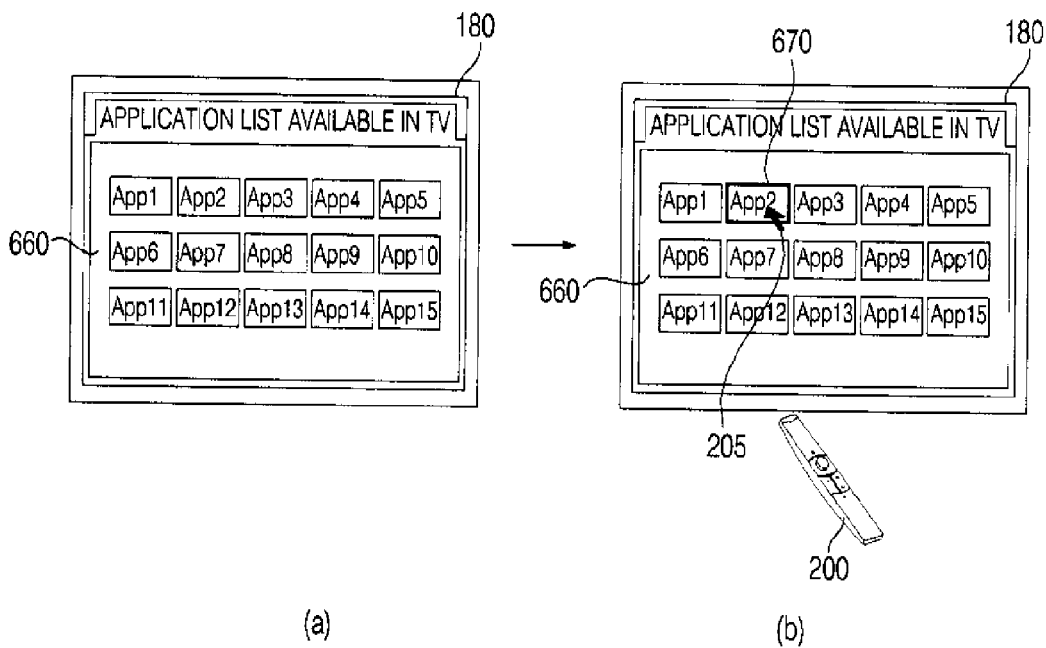
FIG. 16 illustrates a UI in either of the image display apparatuses according to another embodiment of the present invention.

FIG. 16 illustrates an application list available in the image display apparatus, displayed on the display 180. Referring to FIG. 16(a), when the user selects an application list view menu by manipulating the remote controller 200, a list of applications 660 stored in the image display apparatus is displayed on the display 180. While only icons representing the applications are shown in FIG. 16, the application list 660 may further include brief descriptions of the applications, like the application list 610 illustrated in FIG. 15. Therefore, the user can readily identify the applications.

FIG. 16(b) illustrates selection of one application 670 from the application list 660 using the pointer 205 of the remote controller 200. Thus, the selected application 670 may be easily executed.

While it is shown in FIGS. 15 and 16 that the user selects a desired application by moving the pointer 205 using the remote controller 200, the application may be selected in many other ways. For example, the user may select a specific application using a cursor displayed on the display 180 by a combined input of a local key and an OK key in the remote controller 200.

In another example, if the remote controller 200 has a touch pad, the pointer 205 moves on the display 180 according to touch input of the touch pad. Thus the user may select a specific menu using the touch-based pointer 205.

Figure 17:
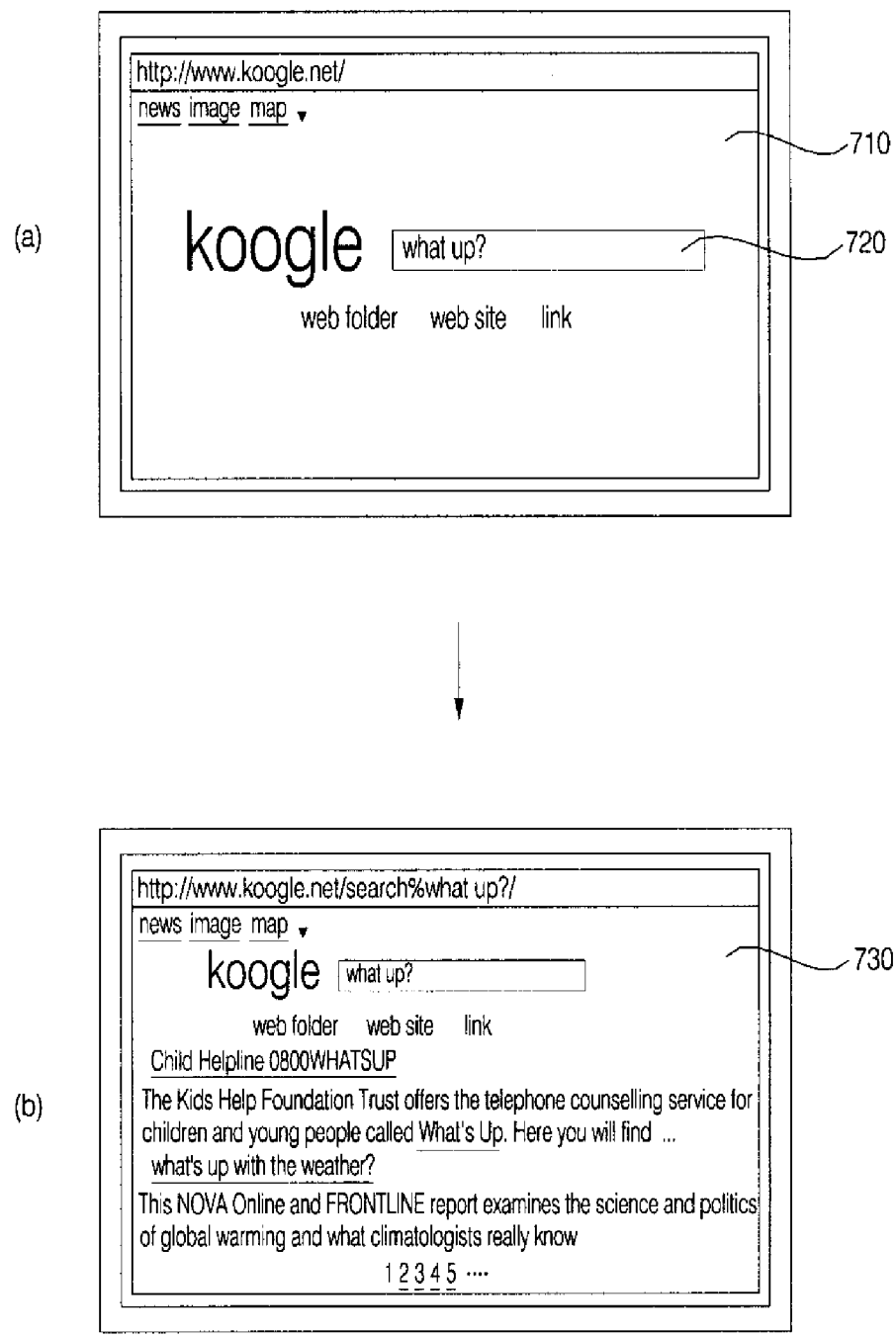
FIG. 17 illustrates a UI in either of the image display apparatuses according to another embodiment of the present invention.

FIG. 17 illustrates a Web page displayed on the display 180. Specifically, FIG. 17(a) illustrates a Web page 710 with a search window 720, displayed on the display 180. The user may enter a character into the search window 720 by use of character keys (not shown) of a keypad displayed on a screen, character keys (not shown) provided as local keys, or character keys (not shown) of the remote controller 200.

FIG. 17(b) illustrates a search result page 730 having search results matching a keyword entered into the search window 720. Since the image display apparatuses according to the embodiments of the present invention are capable of fully browsing a Web page, the user can easily read the Web page.

Figure 18:
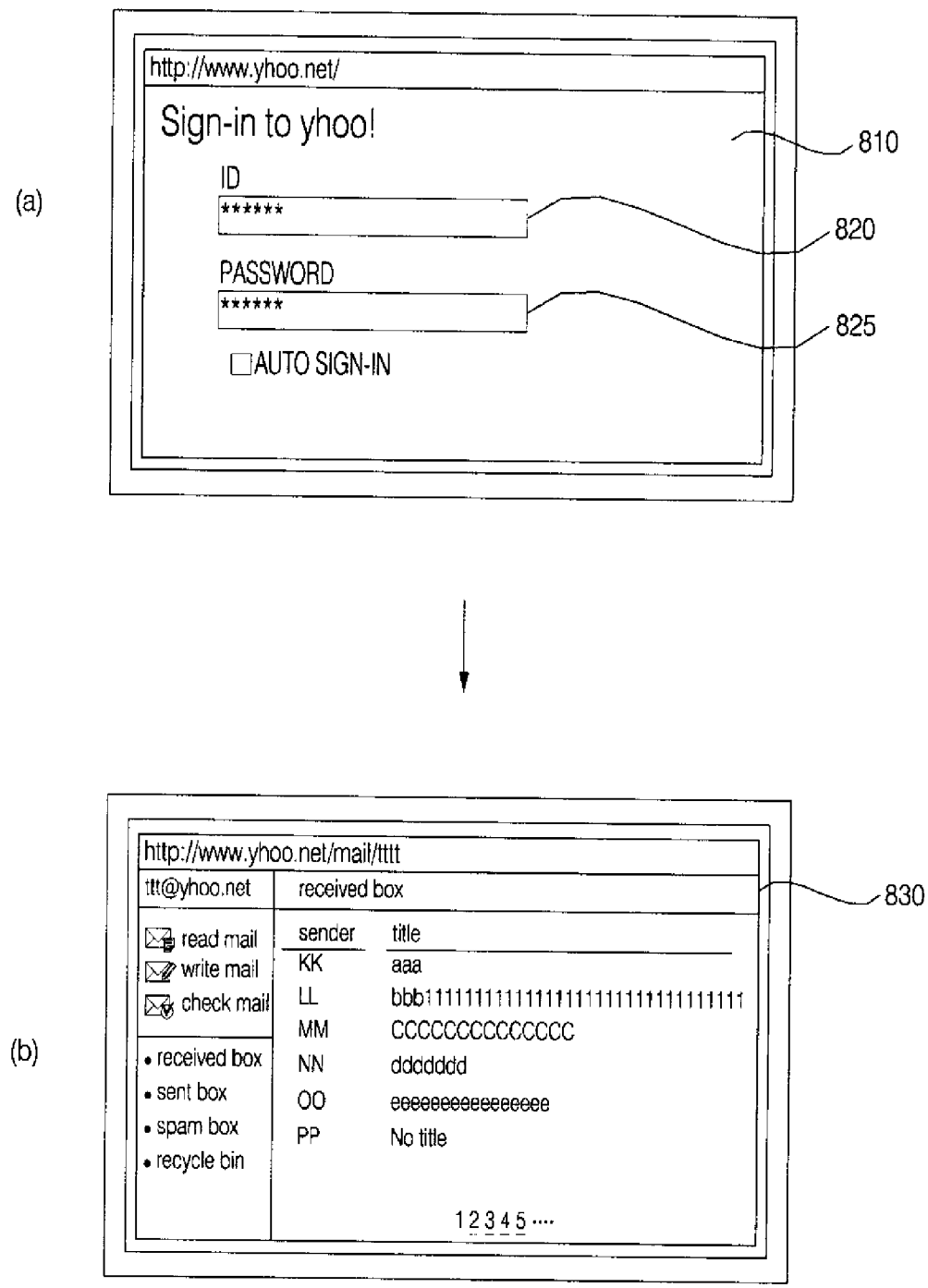
FIG. 18 illustrates a UI in either of the image display apparatuses according to a further embodiment of the present invention.

FIG. 18 illustrates another Web page displayed on the display 180. Specifically, FIG. 18(*a*) illustrates a mail service page 810 including an ID input window 820 and a password input window 825, displayed on the display 180. The user may enter a specific numeral and/or text into the ID input window 820 and the password input window 825 using a keypad (not shown) displayed on the mail service page 810, character keys (not shown) provided as local keys, or character keys (not shown) of the remote controller 200. Hence, the user can log in to a mail service.

FIG. 18(*b*) illustrates a mail page 830 displayed on the display 180, after log-in to the mail service. For example, the mail page 830 may contains items "read mail", "write mail", "sent box", "received box", "recycle bin", etc. In the "received box" item, mail may be ordered by sender or by title.

The image display apparatuses according to the embodiments of the present invention are capable of full browsing when displaying a mail service page. Therefore, the user can use the mail service conveniently.

Figure 19:
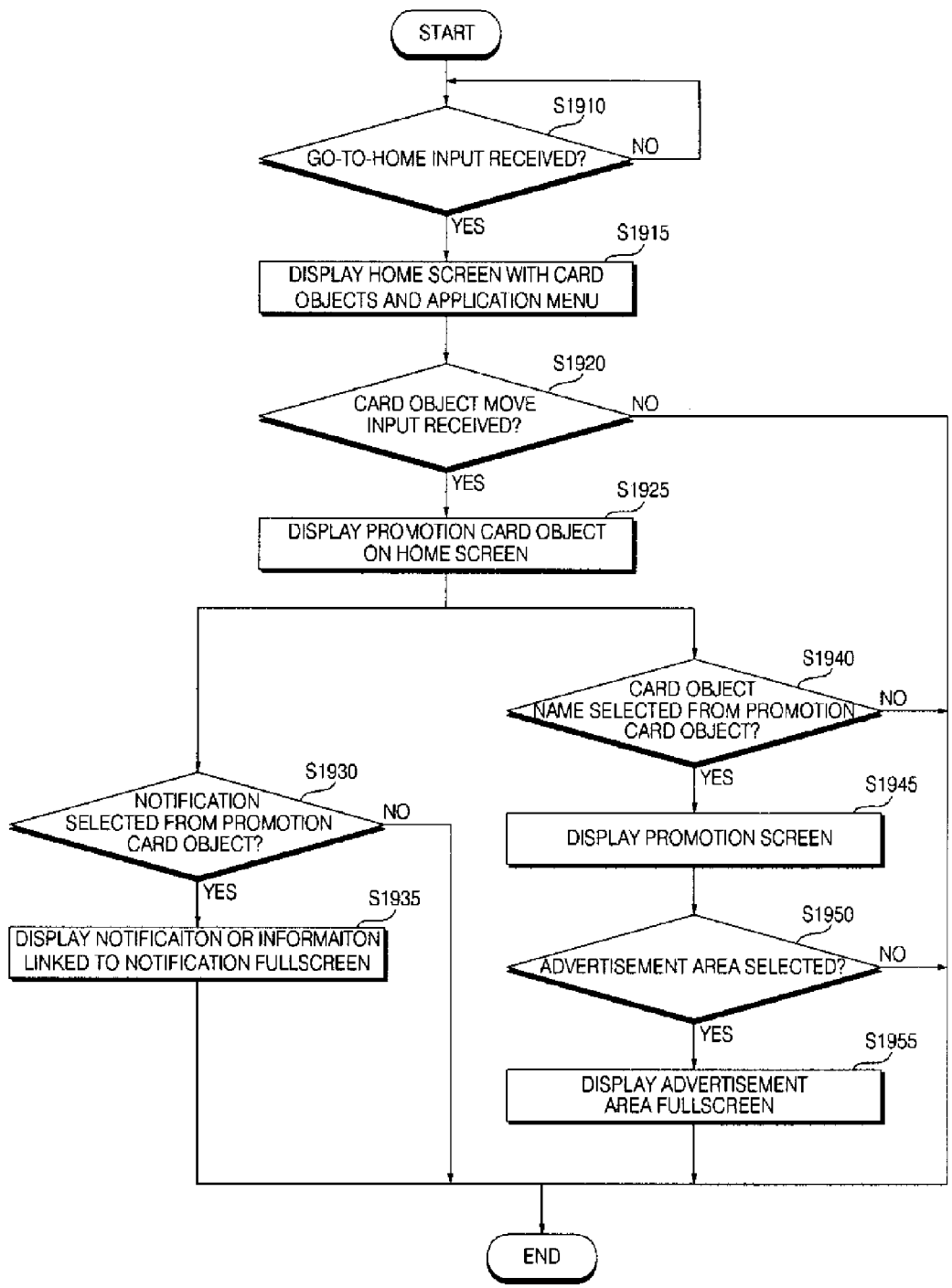
FIG. 19 is a flowchart illustrating a method for operating an image display apparatus according to an embodiment of the present invention.

FIG. 19 is a flowchart illustrating a method for operating an image display apparatus according to an embodiment of the present invention and FIGS. 20 to 39 are views referred to for describing various examples of the method for operating an image display apparatus, illustrated in FIG. 19.

Referring to FIG. 19, it is determined whether a go-to-home input has been received (S1910). Upon receipt of a go-to-home input, a home screen including a card object area and an application menu area is displayed (S1915).

Specifically, the controller 170 determines whether a go-to-home input has been received, through input of a local key (not shown) or manipulation of the remote controller 200. The go-to-home input may be generated when the image display apparatus is powered on or wakes from standby mode, or when a local key (not shown) or a home key or menu key of the remote controller 200 is manipulated.

Upon receipt of the go-to-home input, the controller 170 may control display of a home screen including a plurality of card objects and an application menu on the display 180. The plurality of card objects and the application menu may be sequentially displayed.

On the home screen, the card object area may include a plurality of card objects classified according to content sources. For examples, the card objects may be a card object for displaying a broadcast image, a card object for providing a CP list, and a card object for providing a list of applications. The card objects will be described later with reference to FIGS. 20 to 39.

These card objects may be generated in a card object generator 345 of the image display apparatus 100. The card object generator 345 may be included in the controller 170 or may be included in the OSD generator 340 of the controller 170 or may be configured as a separate GPU. The plurality of card objects generated from the card object generator 345 may be transmitted to and displayed on the display 180.

On the home screen, the application menu area may include a plurality of application menu items, particularly mandatory application menu items and optional application menu items set by the user. The application menu is an application compact-view menu, which may include a view more menu item for a fullscreen-view function. The application menu will be described later with reference to FIGS. 20 to 39.

The application menu may be generated in an application menu generator (not shown) of the image display apparatus 100. The application menu generator may be included in the OSD generator 340 of the controller 170 or may be configured as a separate GPU. The application menu generated from the application menu generator may be transmitted to and displayed on the display 180.

A favorite channel object for indicating favorite channels may be displayed on the home screen. Especially, the favorite channel object may be included in the card object that displays a broadcast image among the plurality of card objects. The favorite channel object will be described later with reference to FIGS. 20 to 39.

As stated before, the display 180 may display the home screen when the image display apparatus is powered on or a home key is input. The configuration of the home screen allows the user to easily select a desired service, thus increasing user convenience.

It is then determined whether a card object move input has been received (S1920). Upon receipt of the card object move input, a PROMOTION card object is displayed on the home screen (S1925).

Specifically, the controller 170 determines whether a card object move input has been received through input of a local key (not shown) or manipulation of the remote controller 200, with the home screen displayed on the display 180. Upon receipt of the card object move input, the controller 170 may control movement of at least one card object corresponding to the card object move input on the display 180. For example, the PROMOTION card object hidden from the display 180 in a hidden area may show up on the display 180 according to the card object move input. This operation will be described later with reference to FIGS. 20 to 21.

It is determined whether a notification has been selected from the PROMOTION card object (S1930). Upon selection of the notification, the notification is displayed in fullscreen on the display 180 or information linked to the notification is displayed on the display 180 (S1935).

Specifically, with the PROMOTION card object displayed on the home screen, the controller 170 determines whether a notification included in the PROMOTION card object has been selected through input of a local key (not shown) or manipulation of the remote controller 200. Upon selection of the notification, the controller 170 controls fullscreen display of the selected notification or display of information linked to the selected notification, which will be described later with reference to FIGS. 24 and 25.

With the PROMOTION card object displayed on the home screen, it is determined whether a card object name has been selected in the PROMOTION card object (S1940). Upon selection of the card object name in the PROMOTION card object, a promotion screen may be displayed (S1945).

Specifically, with the PROMOTION card object displayed on the home screen, the controller 170 determines whether the card object name has been selected from the PROMOTION card object through input of a local key (not shown) or manipulation of the remote controller 200. Upon selection of the card object name in the PROMOTION card object, the controller 170 controls display of a promotion screen including at least one of a notification list or an advertisement area, which will be described later with reference to FIGS. 26 and 27.

With the advertisement area displayed on the promotion screen, it is determined whether the advertisement area has been selected (S1950). Upon selection of the advertisement area, the advertisement area may be displayed fullscreen (S1955).

Specifically, with the advertisement area displayed on the promotion screen, the controller determines whether the advertisement area has been selected though input of a local key (not shown) or manipulation of the remote controller 200. Upon selection of the advertisement area, the controller 170 controls fullscreen display of the advertisement area, which will be described later with reference to FIG. 28.

As described before, if the image display apparatus 100 is a set-top box without the display 180, the operation method illustrated in FIG. 19 may amount to output of data for displaying an image or a screen on the display 180.

For example, the controller 170 determines whether a go-to-home input has been received in step S1910. Upon receipt of the go-to-home input, the controller 170 may output data needed to display a home screen including a card object area and an application menu area. The display 180 may display the home screen using the data.

In the same manner, steps S1915, S1925, S1935, S1945 and S1955 may be performed as the process of outputting data for displaying an image or a screen.

Figure 20:
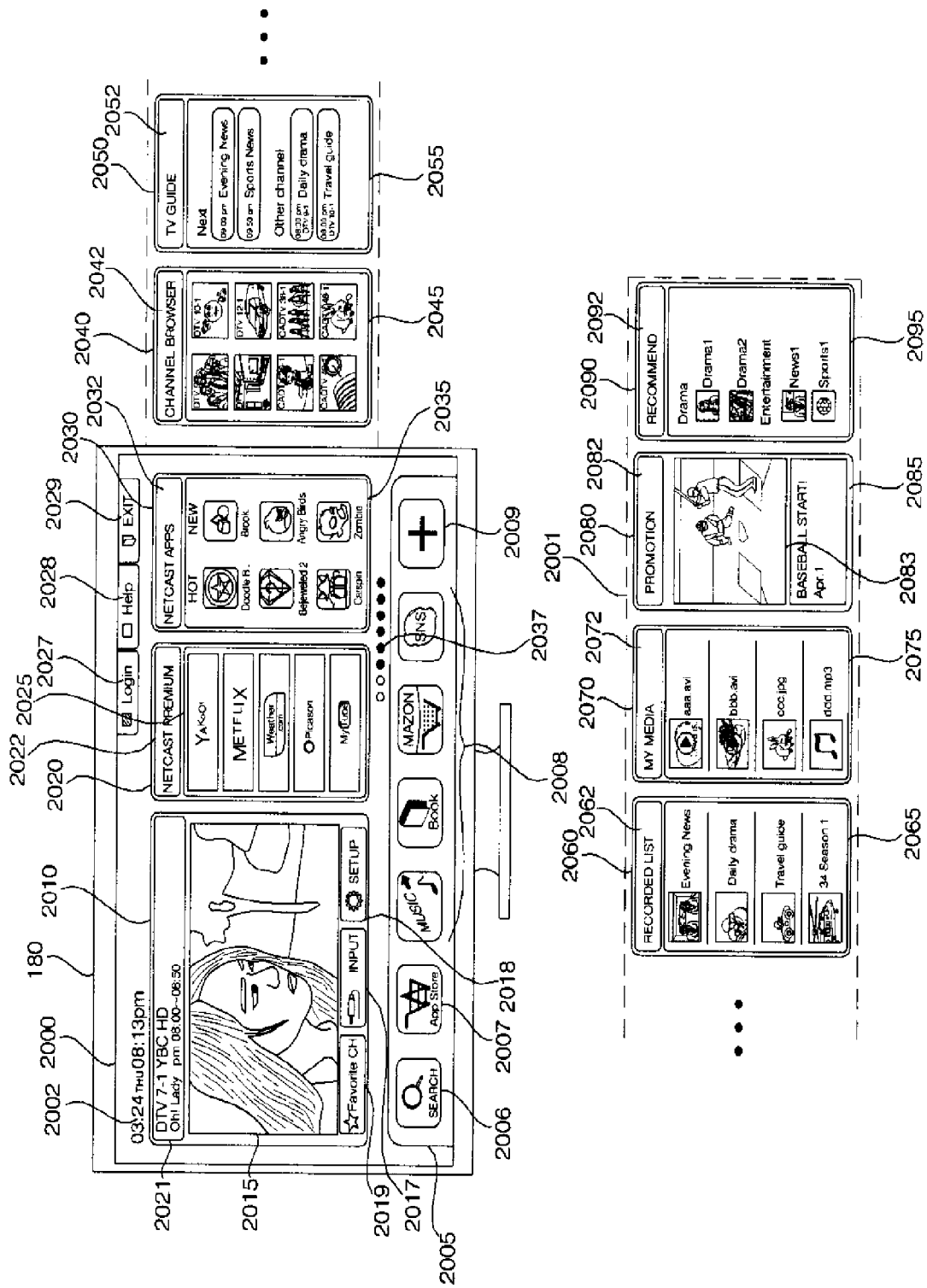
FIGS. 20 to 39 are views referred to for describing various examples of the method for operating an image display apparatus, illustrated in FIG. 19.

FIG. 20 illustrates an exemplary home screen displayed on the display 180.

The home screen configuration illustrated in FIG. 20 may be an example of a default screen configuration for a smart TV. The home screen may be set as an initial screen that is displayed when the image display apparatus is powered on or wakes from standby mode, or as a default screen that is displayed when a local key (not shown) or a home key of the remote controller 200 is manipulated.

Referring to FIG. 20, a card object area and an application menu area may be defined in a home screen 2000.

The card object area may include a plurality of card objects 2010, 2020 and 2030 classified according to content sources.

In the illustrated case of FIG. 20, the card object 2010 is named BROADCAST and displays a broadcast image. The card object 2020 is named NETCAST PREMIUM and provides a CP list. The card object 2030, which is named NETCAST APPS, provides a list of applications.

Other card objects may be arranged in a hidden area 2001 and thus not displayed on the display 180. These card objects may be shifted to show up on the display 180, substituting for card objects displayed on the display 180. The hidden card objects are a CHANNEL BROWSER card object 2040 for providing a thumbnail list of broadcast channels, a TV GUIDE card object 2050 for providing a program list, a RECORDED LIST card object 2060 for providing a list of recorded programs, a MY MEDIA card object 2070 for providing a media list, a PROMOTION card object 2080 for announcing a notification, and a RECOMMENDED card object 2090 for providing a list of content recommended by a CP.

The BROADCAST card object 2010 may contain a broadcast image 2015 received through the tuner 110 or the network interface 130, an object 2021 for providing information about the broadcast image 2015, an object 2017 representing an external device, a setup object 2018, and a favorite channel object 2019 for indicating favorite channels.

The broadcast image 2015 is displayed as a card object. Since the broadcast image 2015 may be fixed in size by a lock function, the user may continue viewing the broadcast image 2015 conveniently.

It is also possible to scale the broadcast image 2015 according to user manipulation. For instance, the broadcast image 2015 may be enlarged or contracted by dragging the broadcast image 2015 with the pointer 205 of the remote controller 200. As the broadcast image 2015 is scaled up or down, four or two card objects may be displayed on the display 180, instead of the current three card objects.

When the broadcast image 2015 is selected in the card object 2010, the broadcast image 2015 may be fullscreened on the display 180.

The object 2021 representing information about the broadcast image 2015 may include a channel number (DTVI-1), a channel name (YBC HD), the title of a broadcast program (Oh! Lady), and airing time (8:00-8:50 PM) of the broadcast program. Therefore, the user can readily be aware of information about the displayed broadcast image 2015.

If the user selects the object 2021, related EPG information may be displayed on the display 180.

An object 2002 for notifying a date (03.24), a day (THU), and a current time (8:13 PM) may be positioned above the card object 2010 that displays a broadcast image. Thus the user can readily identify time information through the object 2002.

The object 2017 may represent an external device connected to the image display apparatus 100. For example, if the object 2017 is selected, a list of external devices connected to the image display apparatus 100 may be displayed.

The setup object 2018 may be used to set various settings of the image display apparatus 100, such as video settings, audio settings, screen settings, program scheduling settings, setting of the pointer 205 of the remote controller 200, and network settings.

The favorite channel object 2019 may be used to list favorite channels. For example, upon selection of the favorite channel object 2019, a favorite channel card object 2610 may be displayed.

The card object 2020 representing a CP list may contain a card object name 2022 (NETCAST PREMIUM) and a CP list 2025. While Yakoo, Metflix, weather.com, Picason, and My tube are shown as CPs in the CP list 2025 in FIG. 20, it is obvious that many other options are possible.

Upon selection of the card object name 2022, the card object 2020 may be displayed fullscreen on the display 180.

If a specific CP is selected from the CP list 2025, a screen with a list of content provided by the selected CP may be displayed on the display 180.

The card object 2030 representing an application list may include a card object name 2032 (NETCAST APPS) and an application list 2035. Applications may be sorted into predetermined categories in the application list 2035. In the illustrated case of FIG. 20, applications are sorted by popularity (HOT) and by time (NEW), which should not be interpreted as limiting the present invention.

Upon selection of the card object name 2032, the card object 2030 may be displayed fullscreen on the display 180.

Upon selection of an application from the application list 2035, a screen that provides information about the selected application may be displayed on the display 180.

A Login menu item 2027, a Help menu item 2028, and an Exit menu item 2029 may be displayed above the card objects 2020 and 2030.

The user may log in to an app store or a network connected to the image display apparatus using the Login menu item 2027. The Help menu item 2028 provides guidance on operation of the image display apparatus 100. The Exit menu item 2029 is used to exit the home screen. When the Exit menu item 2029 is selected, a received broadcast image may be fullscreened on the display 180.

An object 2037 may be displayed under the card objects 2020 and 2030 to indicate the total number of available card objects. Alternatively or additionally, the object 2037 may indicate the number of card objects being displayed on the display 180 as well.

The card object 2040 representing a thumbnail list of broadcast channels may include a card object name 2042 (CHANNEL BROWSER) and a thumbnail list of broadcast channels 2045. Sequentially received broadcast channels are represented as thumbnail images in FIG. 20. The thumbnail images may be still images or moving pictures. The thumbnail list 2045 may include information about the channels along with the thumbnail images of the channels, so that the user can readily identify broadcast programs of the channels. The thumbnail images may include a thumbnail image of a broadcast image that the user is viewing or thumbnail images of channels following or previous to the channel of the broadcast image 2015 displayed in the card object 2010. Although eight thumbnail images are displayed in FIG. 20, many other configurations are possible. Thumbnail images may be updated in the thumbnail list 2045.

Upon selection of the card object name 2042, the card object 2040 may be fullscreened on the display 180. That is, information about the thumbnail list 2045 may be displayed on the display 180.

Upon selection of a thumbnail image from the thumbnail list 2045, a broadcast image corresponding to the channel of the selected thumbnail image may be displayed on the display 180.

The card object 2050 providing a program list may contain a card object name 2052 (TV GUIDE) and a program list 2055. The program list 2055 may list broadcast programs that air after the broadcast program of the broadcast image 2015 or broadcast programs of other channels, to which the present invention is not limited.

Upon selection of the card object name 2052, the card object 2050 may be fullscreened on the display 180.

If a program is selected from the program list 2055, a broadcast image of the selected program or broadcast information about the selected program may be displayed on the display 180.

The card object 2060 representing a recorded program list may include a card object name 2062 (RECORDED LIST) and a scheduled or recorded program list 2065. The scheduled or recorded program list 2065 may include programs scheduled for recording or programs recorded by scheduling. Although a thumbnail image is displayed for each program, this is merely an exemplary application and thus various examples can be considered.

Upon selection of the card object name 2062, the card object 2060 may be fullscreened on the display 180.

Upon selection of a scheduled program or a recorded program from the scheduled or recorded program list 2065, broadcast information about the scheduled or recorded broadcast program or broadcast images of the scheduled or recorded broadcast program may be displayed on the display 180.

The card object 2070 representing a media list may include a card object name 2072 (MY MEDIA) and a media list 2075. The media list 2075 may list media available in the image display apparatus 100 or a device connected to the image display apparatus 100. While the media are shown as moving pictures, still images, and audio in FIG. 20, many other media such as text, e-books, etc. may be added to the media.

Upon selection of the card object name 2072, the card object 2070 may be fullscreened on the display 180.

Upon selection of a file from the media list 2075, the selected file may be opened and a screen corresponding to the selected file may be displayed on the display 180.

The card object 2080 representing a notification may contain a card object name 2082 (PROMOTION) and a notification 2083 and 2085. The notification 2083 and 2085 include a notification or an advertisement received from at least one of a CP, a service provider, a network provider, or an application provider. Therefore, the user can easily read the notification.

Upon selection of the card object name 2082, the card object 2080 may be displayed fullscreen on the display 180.

Upon selection of the notification 2083 and 2085, the notification 2083 and 2085 may be displayed fullscreen or information linked to the notification 2083 and 2085 may be displayed on the display 180.

The card object 2090 representing a list of content recommended by a CP may contain a card object name 2092 (RECOMMENDED) and a recommended content list 2095. The recommended content list 2095 may be a list of content recommended by a CP or a user of a network. While recommended content is classified into drama and entertainment such as news and sports in the illustrated case of FIG. 20, this is purely exemplary and thus many other options are possible. For example, the recommended content may be classified into drama, movies, news, sports, animation, music, books, Web, etc. Hence, the user can easily identify recommended content by category.

Upon selection off the card object name 2092, the card object 2090 may be displayed fullscreen on the display 180.

Upon selection of specific content from the recommended content list 2095, an image corresponding to the selected content may be displayed on the display 180.

The card objects 2020 and 2030 displayed on the display 180 may be exchanged with the hidden card objects 2040 to 2090 according to a card object move input. Specifically, at least one of the card objects 2020 or 2030 being displayed on the display 180 may move to the hidden area 2001 and in turn, at least one of the hidden objects 2040 to 2090 may appear on the display 180.

An application menu 2005 includes a plurality of application menu items, particularly predetermined menu items 2006 to 2009 selected from among all available application menu items on the display 180. Thus the application menu 2005 may be referred to as an application compact-view menu.

The application menu items 2006 to 2009 may be divided into mandatory application menu items 2006, 2007 and 2009 (Search, App Store, and +) and optional application menu items 2008 (Music, Book, MAZON, and SNS) set by the user.

The mandatory application menu items 2006, 2007 and 2009 may be preset as default menu items such that the user is not allowed to edit the same.

The Search application menu item 2006 provides a search function based on an input search keyword. The App Store application menu item 2007 enables the user to access an app store directly. The +(View More) application menu item 2009 may provide a fullscreen function for displaying application menu items fullscreen.

The user-set application menu items 2008 may be edited to represent applications that the user most frequently uses.

In an embodiment of the present invention, an Internet application menu item (not shown) and a mail application menu item (not shown) may be added to the application menu 2005.

For example, upon selection of the Internet application menu item, a Web page may be displayed fullscreen on the display 180, as illustrated in FIG. 17. Upon selection of the mail application menu item from the application menu 2005, a mail service page may be displayed on the display 180, as illustrated in FIG. 18.

The Internet application menu item and the mail application menu item may be fixed items and, accordingly, the user may not delete, rearrange, change or otherwise edit these items. On the other hand, the Internet application menu item and the mail application menu item may be added as user-set application items 2008 so that the user may delete, rearrange, change or otherwise edit these items.

Figure 21:
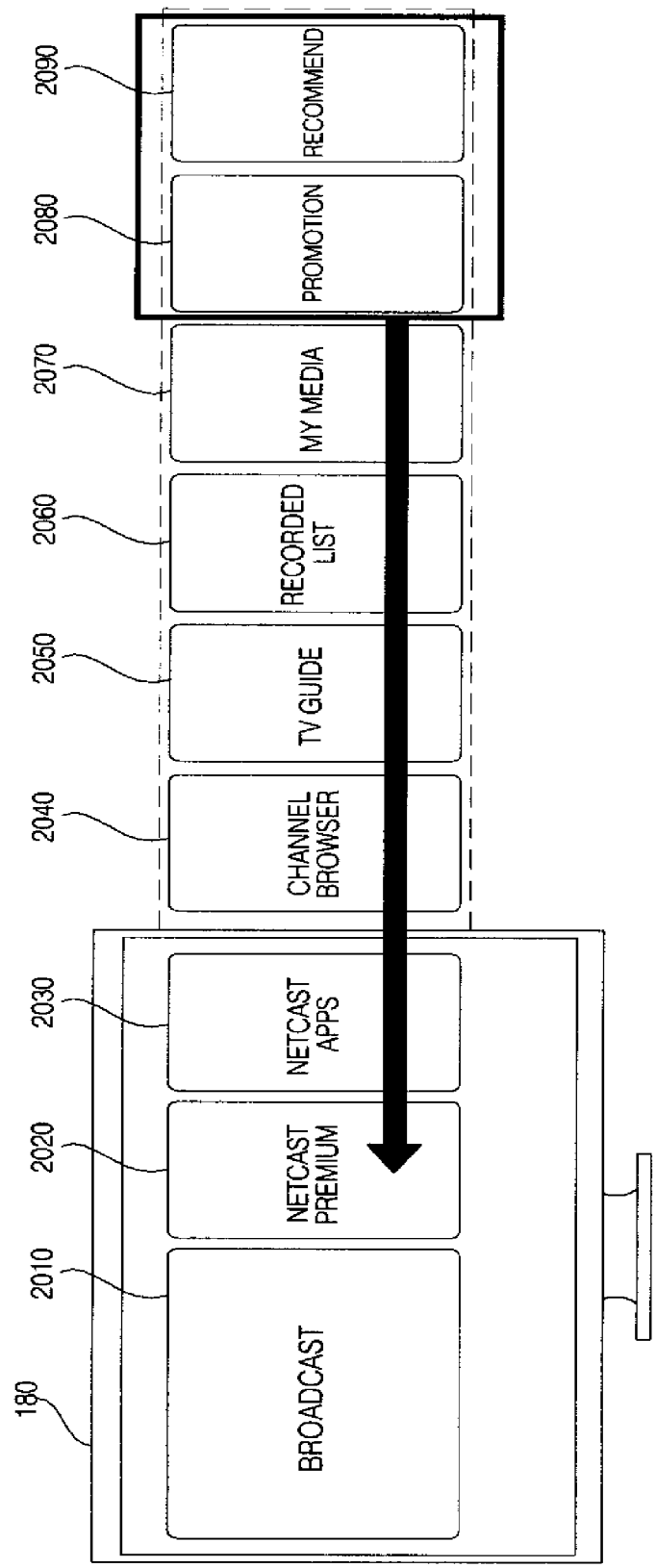
Figure 22:
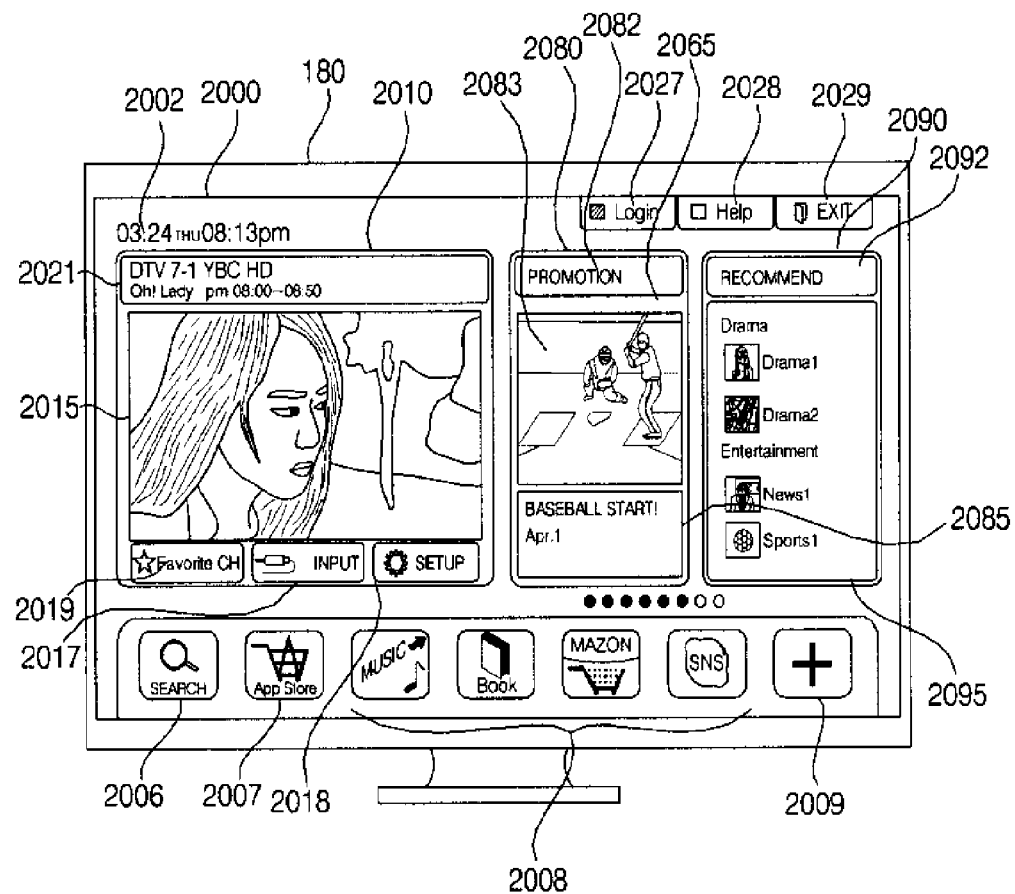

FIGS. 20, 21 and 22 illustrate exemplary display of the PROMOTION card object.

Referring to FIG. 20, upon receipt of a card object move input while the home screen 2000 including the card objects 2010, 2020 and 2030 and the application menu 2005 is being displayed, the PROMOTION card object 2080 moves from the hidden area 2001 to the home screen 2000.

FIG. 21 illustrates movement of the PROMOTION card object 2080 and the RECOMMENDED card object 2090. Therefore, the BROADCAST card object 2010, the PROMOTION card object 2080 and the RECOMMENDED card object 2090 are arranged side by side on the home screen 2000 as illustrated in FIG. 22. Therefore, the user can easily view a notification in the PROMOTION card object 2080.

Figure 23:
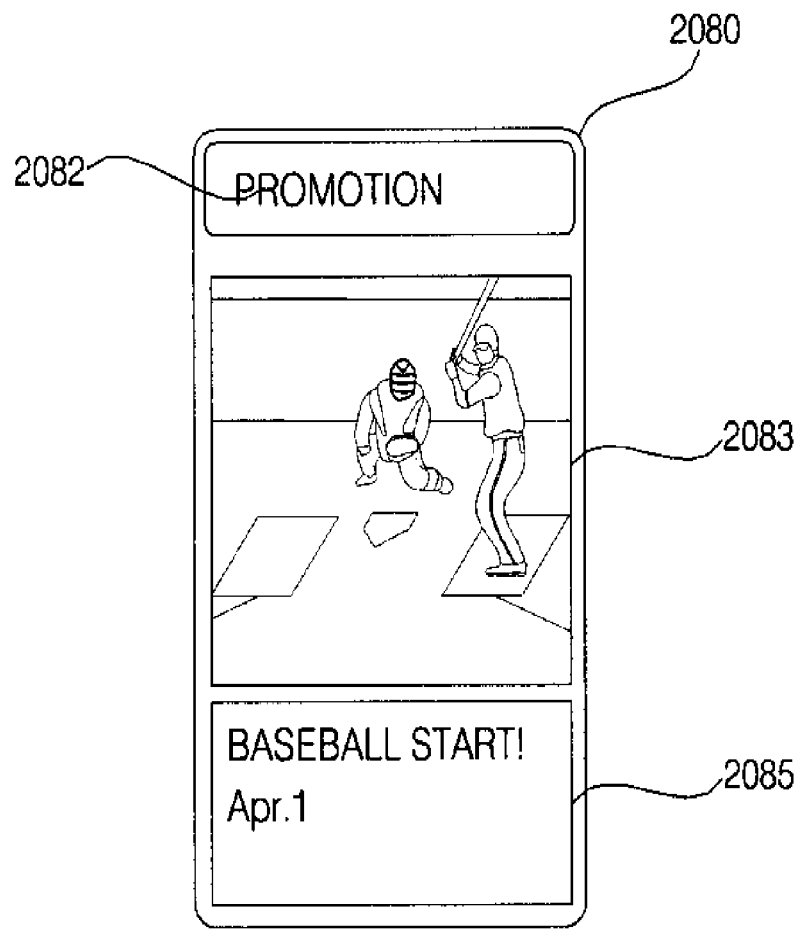

FIG. 23 is an enlarged view of the PROMOTION card object 2080 illustrated in FIG. 20. Referring to FIG. 23, the PROMOTION card object 2080 representing a notification may include the card object name (PROMOTION) 2082 and the notification 2083 and 2085.

The notification 2083 and 2085 may include a notification or an advertisement received from at least one of a CP, a service provider, a network provider, or an application provider. Hence, the user can be readily read the notification.

The notification 2083 and 2085 may take the form of at least one of text, an image or a moving picture. In FIG. 23, the notification includes an image 2083 and text 2085. While a single notification is illustrated in FIG. 23, the PROMOTION card object 2080 may contain a plurality of notifications. A notification list will be described later with reference to FIG. 25.

The notification 2083 and 2085 may be updated periodically. Upon receipt of a new notification or upon updating of an existing notification, the PROMOTION card object 2080 in the hidden area illustrated in FIG. 20 may appear on the home screen 2000 as illustrated in FIG. 22 without a card object move input. Hence, the user can be immediately notified of the latest notification.

The notification data may be received through the network interface 130 or the tuner 110. The card object generator 345 may generate the PROMOTION card object 2080 including the notification 2083 and 2085 using the received notification data. Hence, the PROMOTION card object 2080 may be displayed on the home screen 2000.

While it is shown in FIGS. 20 and 21 that the PROMOTION card object 2080 resides in the hidden area 2001 and appears on the display 180 according to a card object move input, alternatively, the card object generator 345 may generate the PROMOTION card object 2080 upon receipt of the card object move input and then display the PROMOTION card object 2080 on the display 180. The PROMOTION card object 2080 may be generated in real time or stored in advance.

Figure 24:
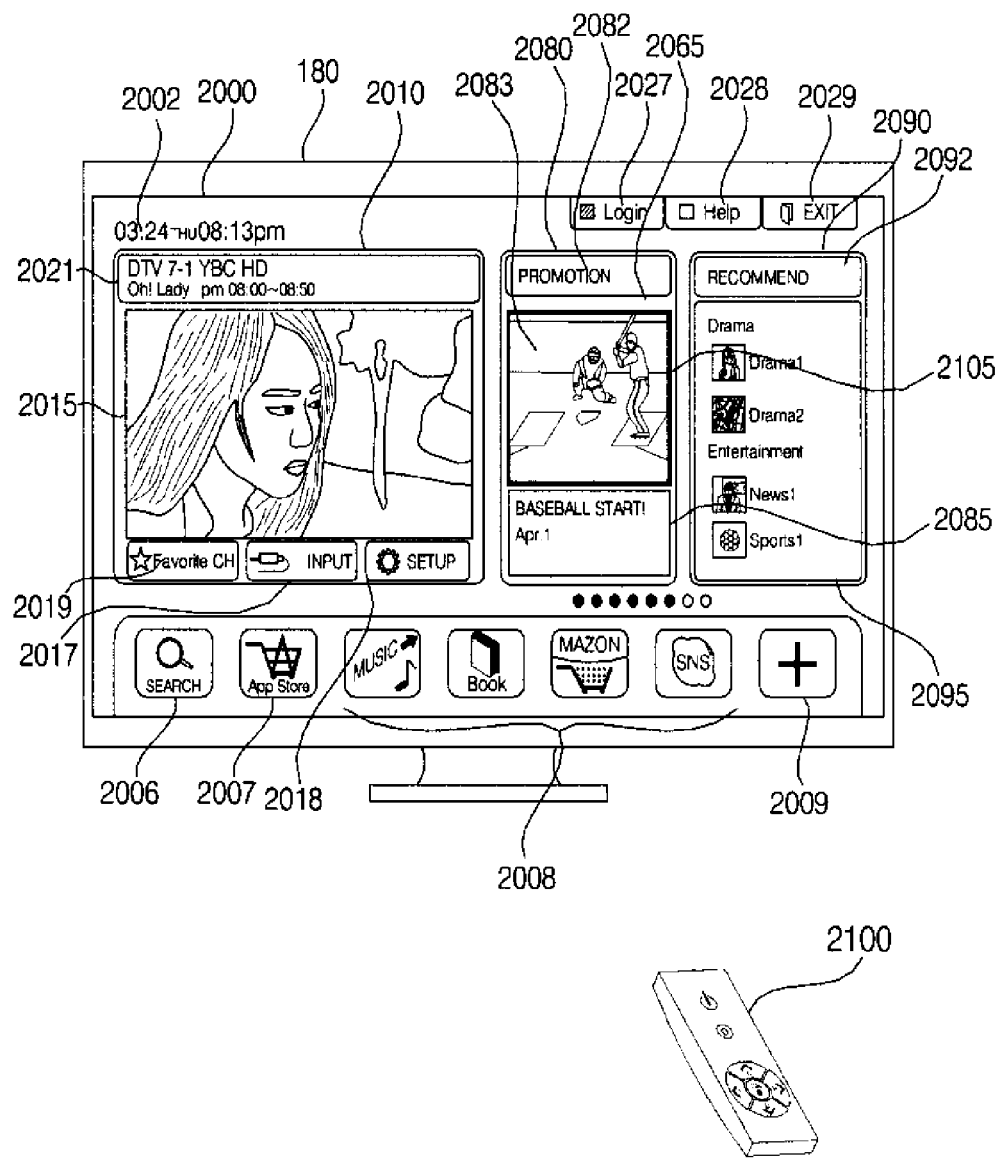
Figure 25:
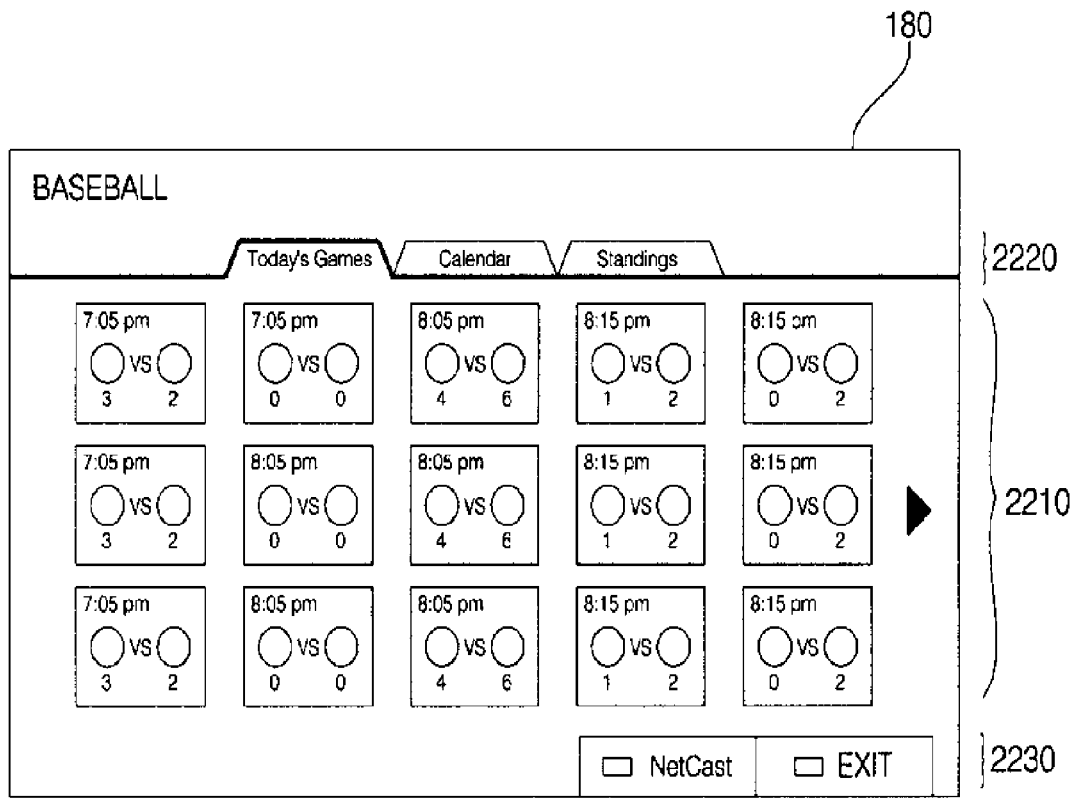

FIGS. 24 and 25 illustrate an exemplary operation for selecting a notification in the PROMOTION card object 2080.

Referring to FIG. 24, with the BROADCAST card object 2010, the PROMOTION card object 2080, and the RECOMMENDED card object 2090 displayed on the home screen 2000, the image notification 2083 is selected by a cursor 2105 of a remote controller 2100, by way of example. It is also possible to select both the image notification 2083 and the text notification 2085.

Referring to FIG. 25, upon selection of the image notification 2083 in the PROMOTION card object 2080, information linked to the image notification 2083 is displayed fullscreen. It is also possible to display the selected image notification 2083 fullscreen and then, upon reselection of the notification, to display information linked to the selected notification.

In the example of FIGS. 24 and 25, the image notification 2083 is about baseball. Hence, baseball-related content may be displayed. For example, menus 2220 may be displayed in the form of tabbed menus including Today's games, Calendar and Standings. For each menu, related information 2210 may be displayed. In the illustrated case of FIG. 25, the Today's Games menu is selected and thus game results are displayed as the information 2210. A menu 2230 including an Exit menu item may be disposed in a lower part of the display 180 for transition to another screen.

Since a CP or any other provider provides a notification, the menu 2230 may further include a menu item "Netcast" for allowing direct access to the CP or any other provider.

The notification may include various information such as soccer information, basketball information, product information, news, emergency notifications, etc.

Because the image display apparatus is capable of full browsing, details of a notification such as game results 2210 may be clearly organized on the display 180.

Figure 26:
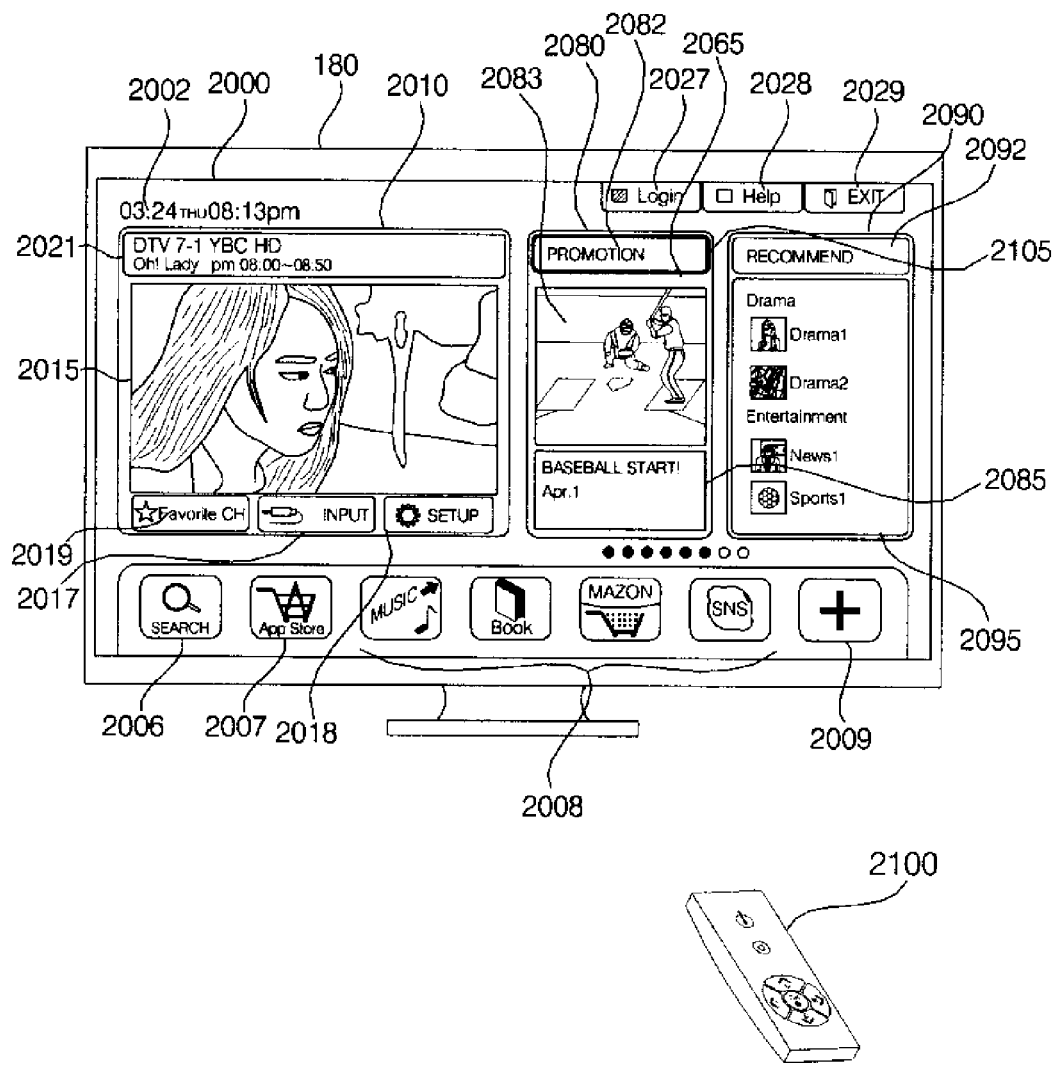
Figure 27:
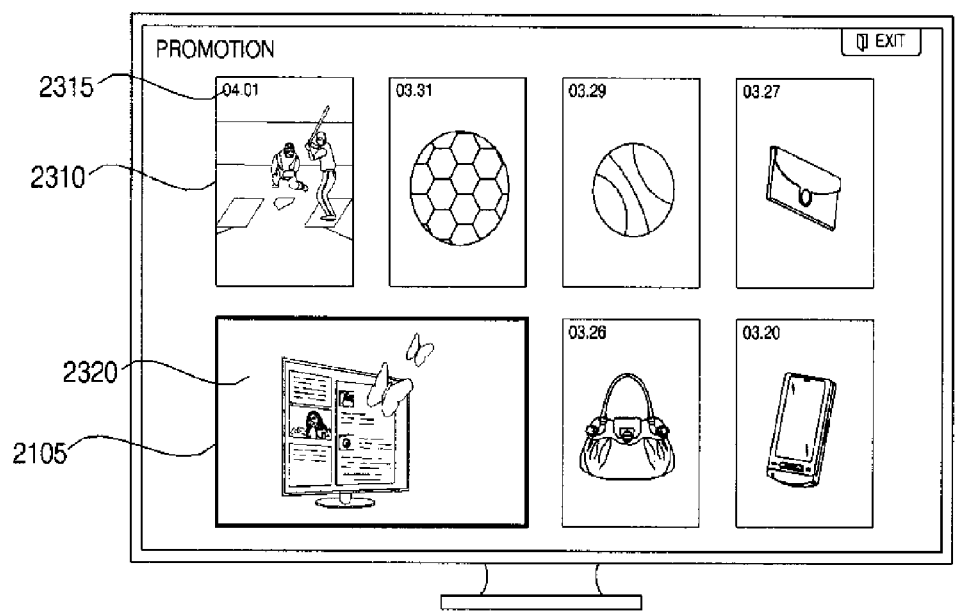
Figure 27:
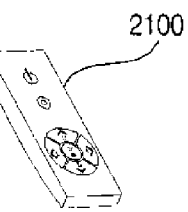
Figure 28:
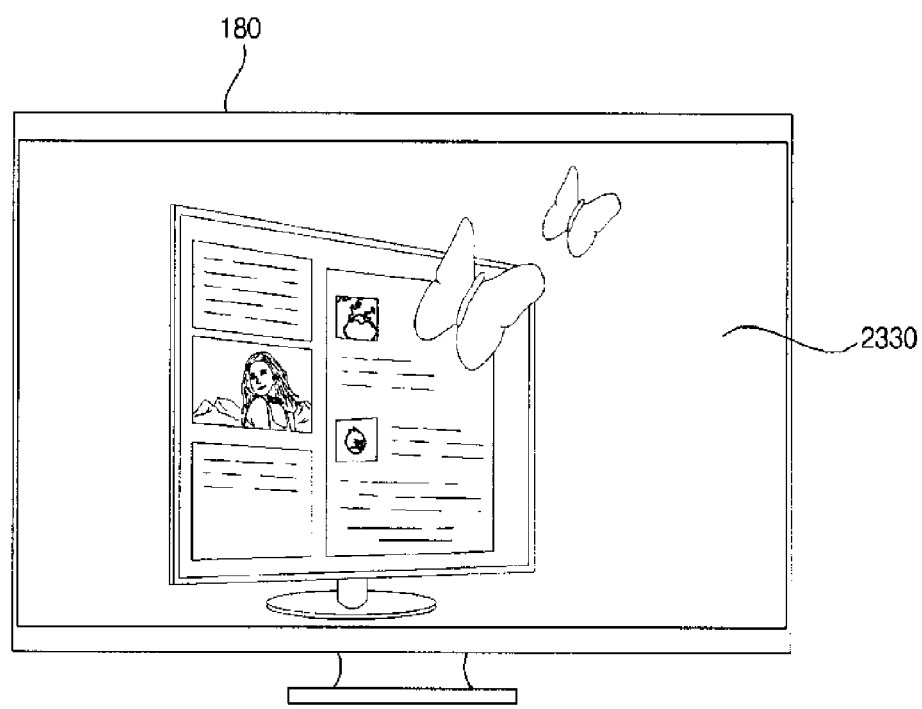

FIGS. 26, 27 and 28 illustrate an exemplary operation for selecting the card object name in the PROMOTION card object 2080.

Referring to FIG. 26, the card object name 2082 is selected by means of the cursor 2105 of the remote controller 2100, while the BROADCAST card object 2010, the PROMOTION card object 2080 and the RECOMMENDED card object 2090 are being displayed on the home screen 2000.

Referring to FIG. 27, upon selection of the card object name 2082 in the PROMOTION card object 2080, a promotion screen including at least one of a notification list or an advertisement area 2320 is displayed fullscreen on the display 180.

In the notification list, notifications may be arranged in the order in which they are received, that is, most recent first, or notifications may be sorted by notification provider or by notification content.

In FIG. 27, notifications are arranged in order of reception, by way of example. Thus a thumbnail image 2310 of the notification displayed in the PROMOTION card object 2080 may be disposed at the top leftmost corner of the promotion screen.

The thumbnail image 2310 of the notification may contain information about a date or time. In FIG. 27, the thumbnail image 2310 includes date information 2315 (04.01) and thumbnail images representing notifications are displayed in order of date.

In addition to the notification list, the advertisement area 2320 may be defined in a part of the display 180.

As stated before, a notification is received from at least one of a CP, a service provider, a network provider, or an application provider. An advertisement may also be received from any of such providers.

In FIG. 27, the advertisement area 2320 is selected by means of the cursor 2105 of the remote controller 2100, by way of example. Thus the selected advertisement area 2320 may be displayed fullscreen, as illustrated in FIG. 28. Therefore, the user may easily watch the advertisement.

Figure 29:
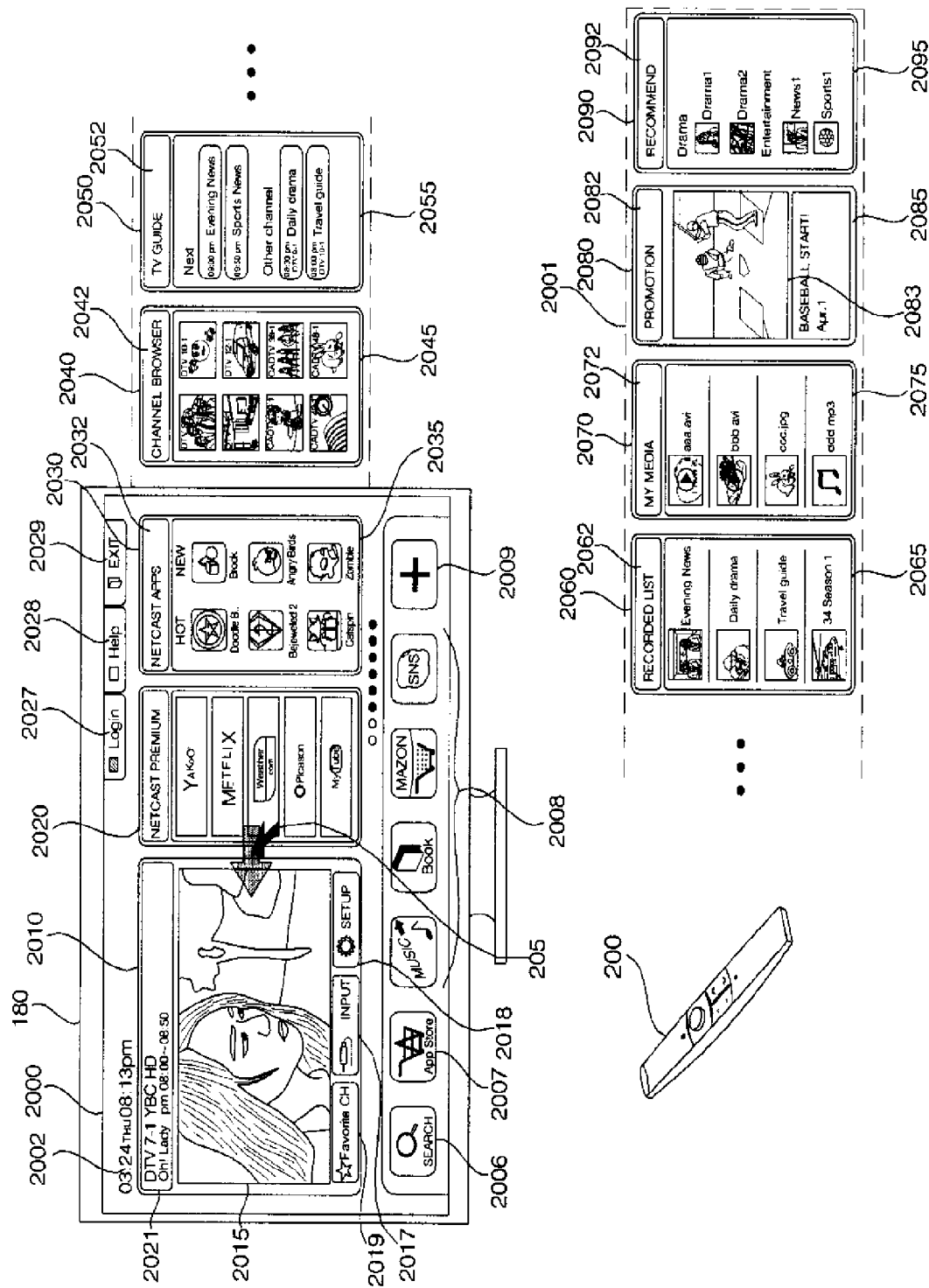
Figure 30:
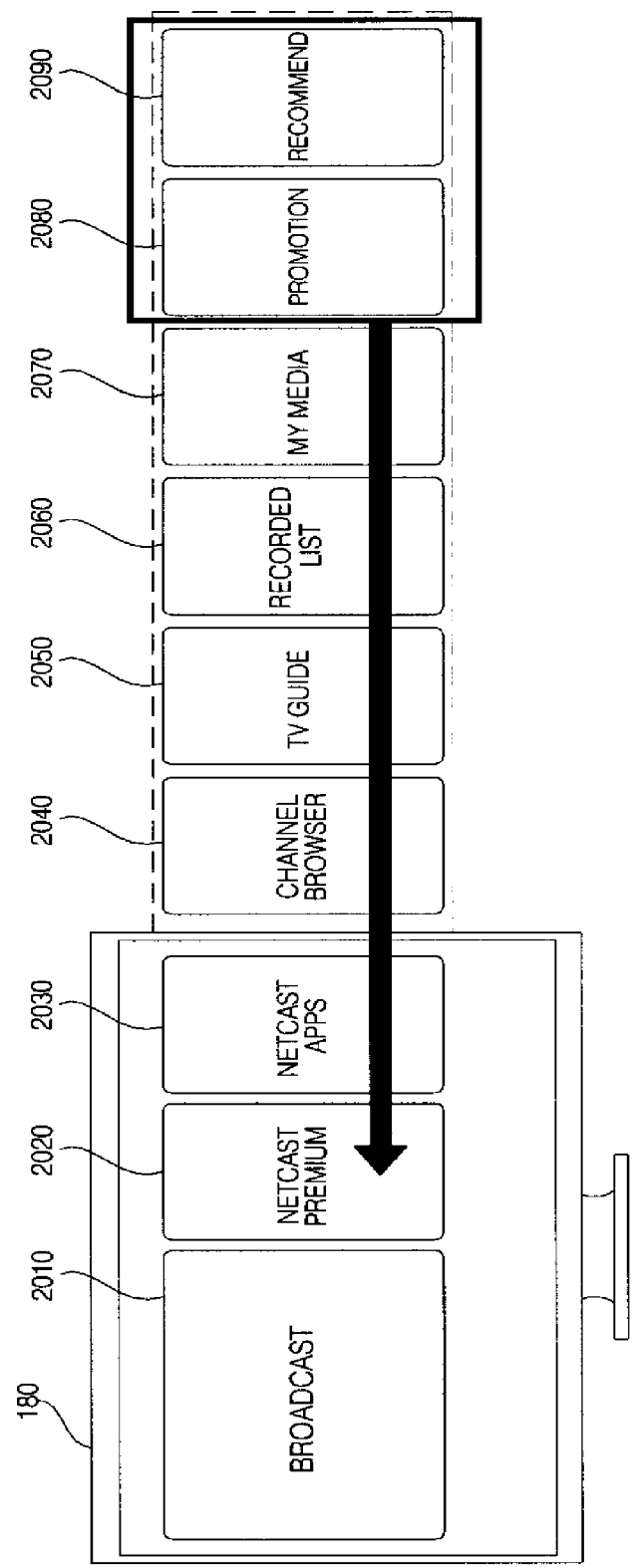
Figure 31:
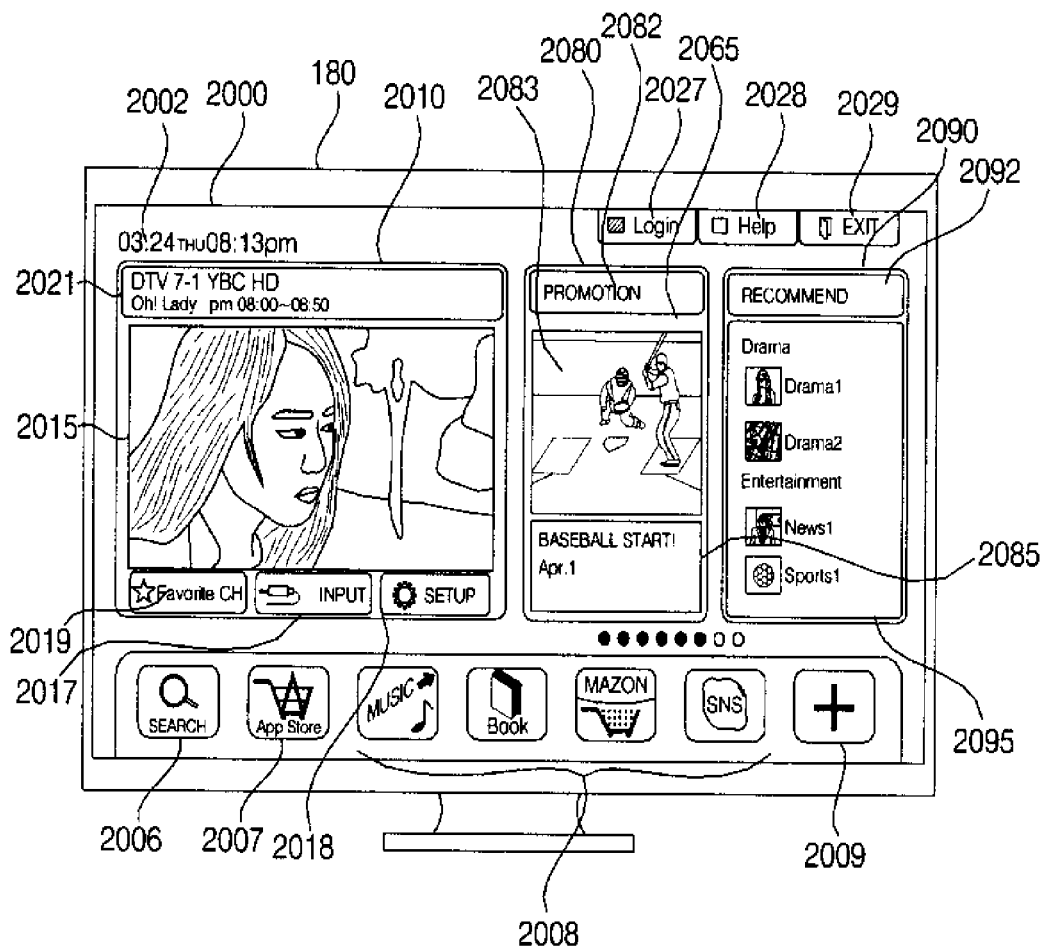

FIGS. 29, 30 and 31 illustrate an exemplary operation for moving card objects by means of a pointer corresponding to movement of a remote controller.

Referring to FIG. 29, while the BROADCAST card object 2010, the NETCAST PREMIUM card object 202, and the NETCAST APPS card object 2030 are displayed on the home screen 2000, a card object, particularly the NETCAST PREMIUM card object 2020 is flicked to the left by the pointer 205 of the remote controller 200, by way of example.

Referring to FIG. 30, the PROMOTION card object 2080 and the RECOMMENDED card object 2090 are moved.

Therefore, the BROADCAST card object 2010, the PROMOTION card object 2080, and the RECOMMENDED card object 2090 are displayed side by side on the home screen 2000, as illustrated in FIG. 31. Accordingly, the user can readily identify the contents of the PROMOTION card object such as a notification.

While card objects including the PROMOTION card object 2080 are moved in twos by moving another card object in FIG. 31, they may be moved one by one. The number of moved card objects may depend on the strength and/or speed with which another card object is flicked.

Figure 32:
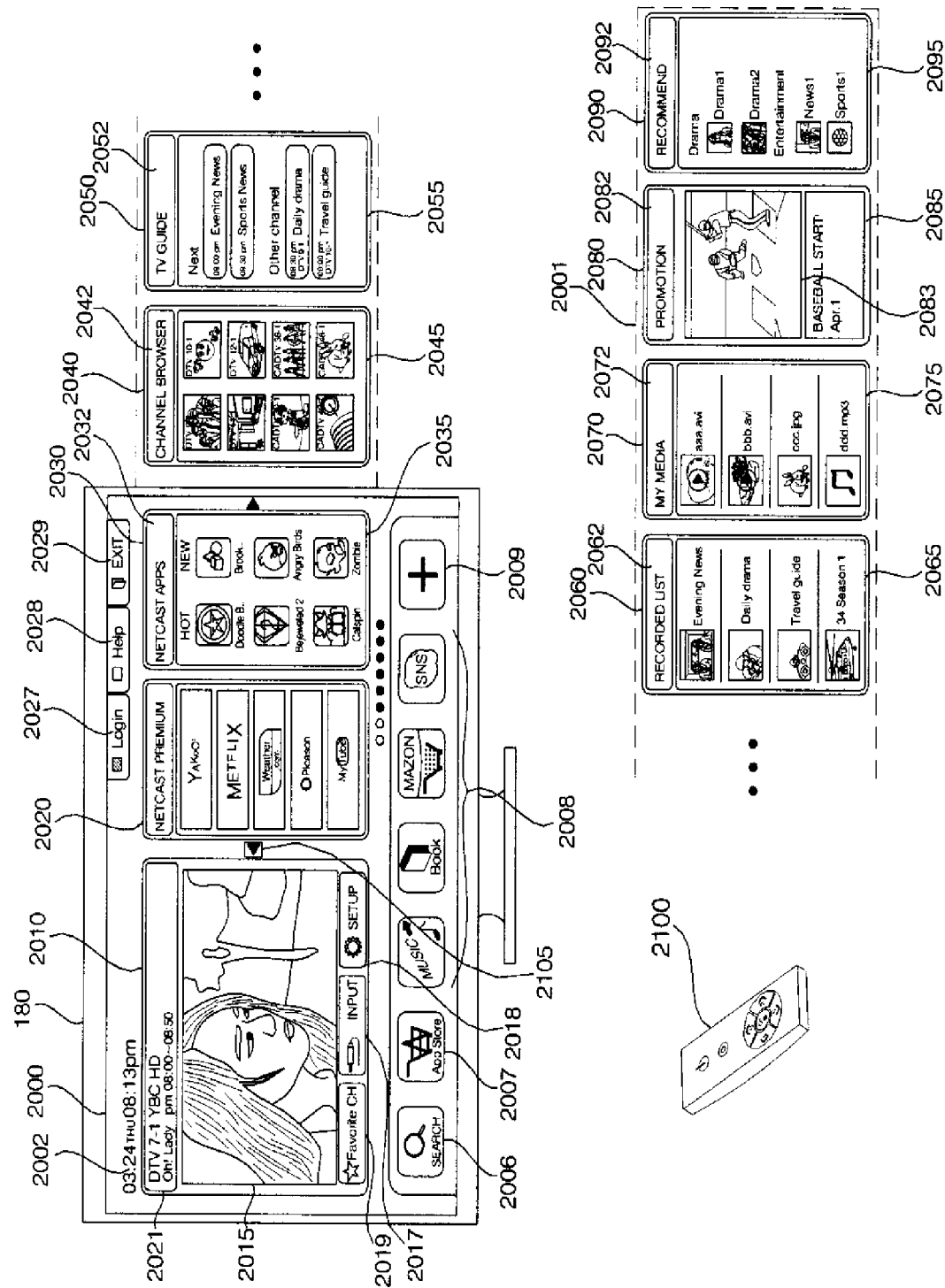
Figure 33:
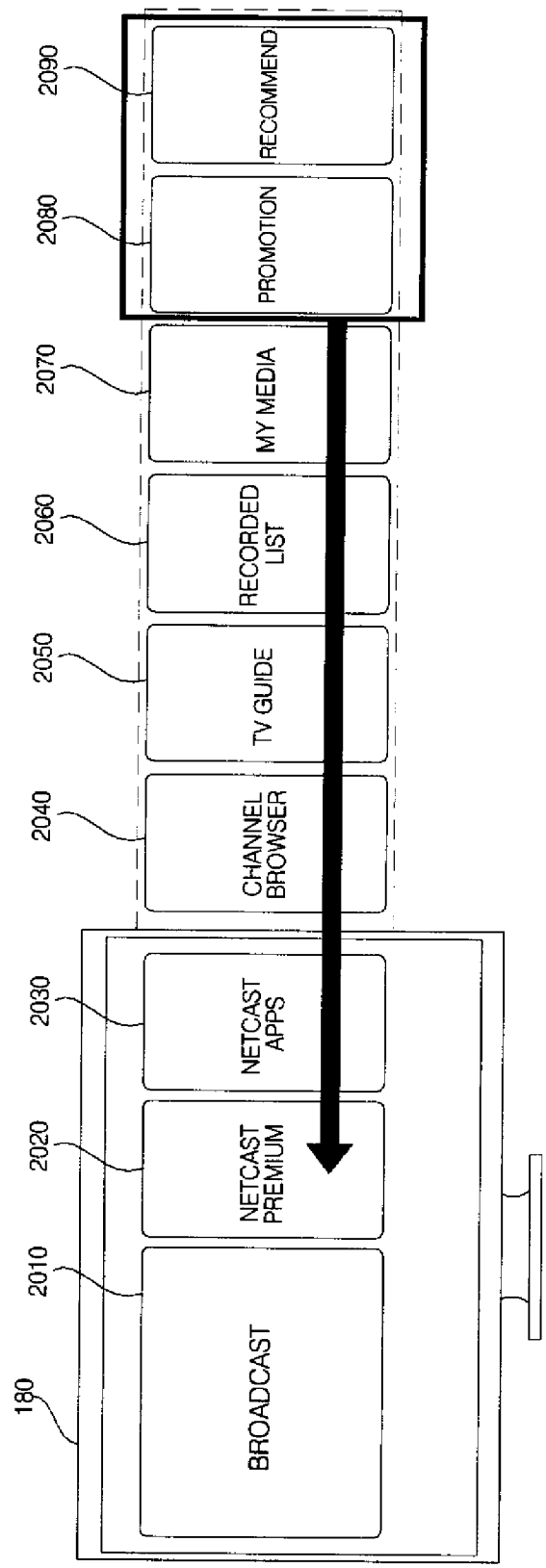

FIGS. 32 and 33 illustrate an exemplary operation for moving card objects through input of a direction key of the remote controller, similarly to FIGS. 29, 30 and 31.

To move a card object, a left movement object and a right movement object may further be displayed at the left side of the NETCAST PREMIUM card object 2020 and at the right side of the NETCAST APPS card object 2030, respectively.

Referring to FIG. 32, with the BROADCAST card object 2010, the NETCAST PREMIUM card object 2020 and the NETCAST APPS card object 2030 displayed on the home screen 2000, the left movement object may be selected by means of a left directional key or an OK key of the remote controller 2100. Herein, the left movement object is selected using the cursor 2105 of the remote controller 2100, by way of example.

Referring to FIG. 33, the PROMOTION card object 2080 and the RECOMMENDED card object 2090 are moved.

Figure 34:
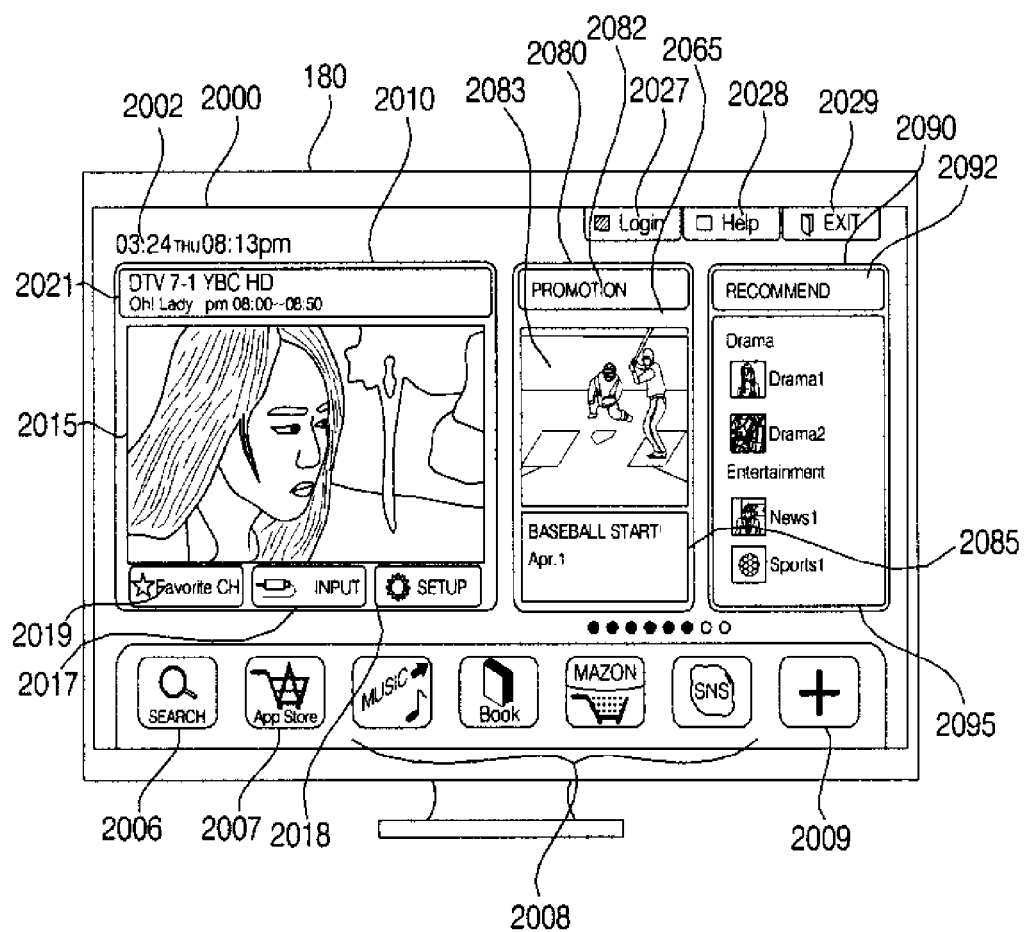

Therefore, the BROADCAST card object 2010, the PROMOTION card object 2080, and the RECOMMENDED card object 2090 are displayed side by side on the home screen 2000, as illustrated in FIG. 34. Accordingly, the user can readily identify the contents of the PROMOTION card object such as a notification.

While card objects are moved in twos in FIG. 34, they may be moved one by one. The number of moved card objects may depend on the number of times the left movement object is selected.

Figure 35:
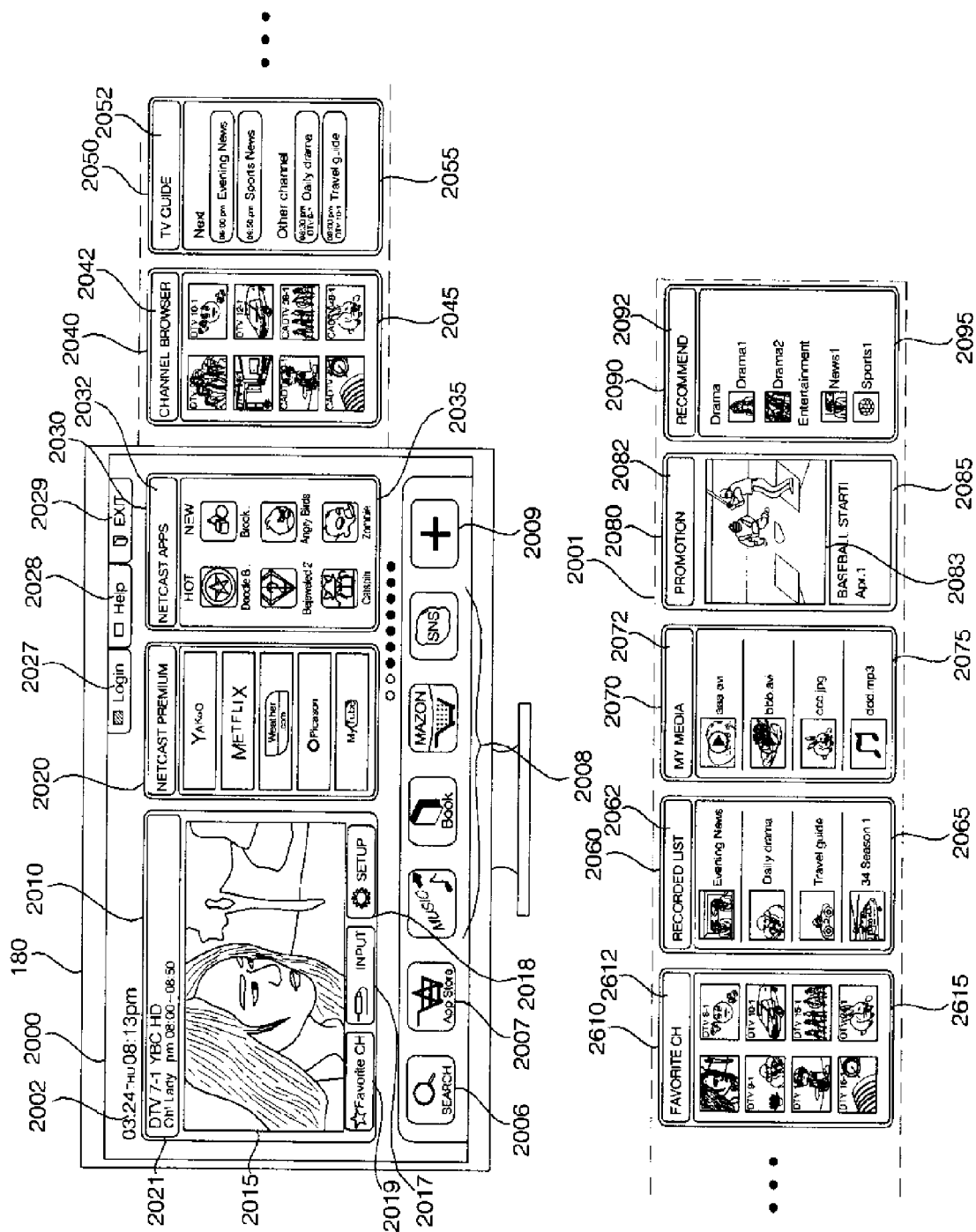

The home screen 2000 illustrated in FIG. 35 is different from the home screen 2000 illustrated in FIG. 20 in that a card object 2610 representing favorite channels is further provided at the right side of the TV GUIDE card object 2050 in the hidden area.

The card object 2610 may include a card object name 2612 (FAVORITE CH) and a list of pre-stored favorite channels 2615. While favorite channels are represented by thumbnail images, to which the present invention is not limited, they may be represented by moving pictures. The favorite channel list 2615 may include information about the favorite channels as well as the thumbnail images of the favorite channels. Hence, the user can readily identify programs airing on the favorite channels. While the FAVORITE CH card object 2610 represents 8 favorite channels in FIG. 35, many other configurations are possible. The thumbnail images may be updated in the FAVORITE CH card object 2610.

Upon selection of the card object name 2612, the card object 2610 may be displayed fullscreen on the display 180. Thus, information about the favorite channel list 2615 may be displayed.

Upon selection of a thumbnail image in the favorite channel card list 2615, a broadcast image of a channel corresponding to the thumbnail image may be displayed on the display 180.

Also in FIG. 35, as a card object is moved, the PROMOTION card object 2080 is displayed on the home screen 2000. Thus the user can readily view the contents of the PROMOTION card object 2080 such as a notification.

Figure 36:
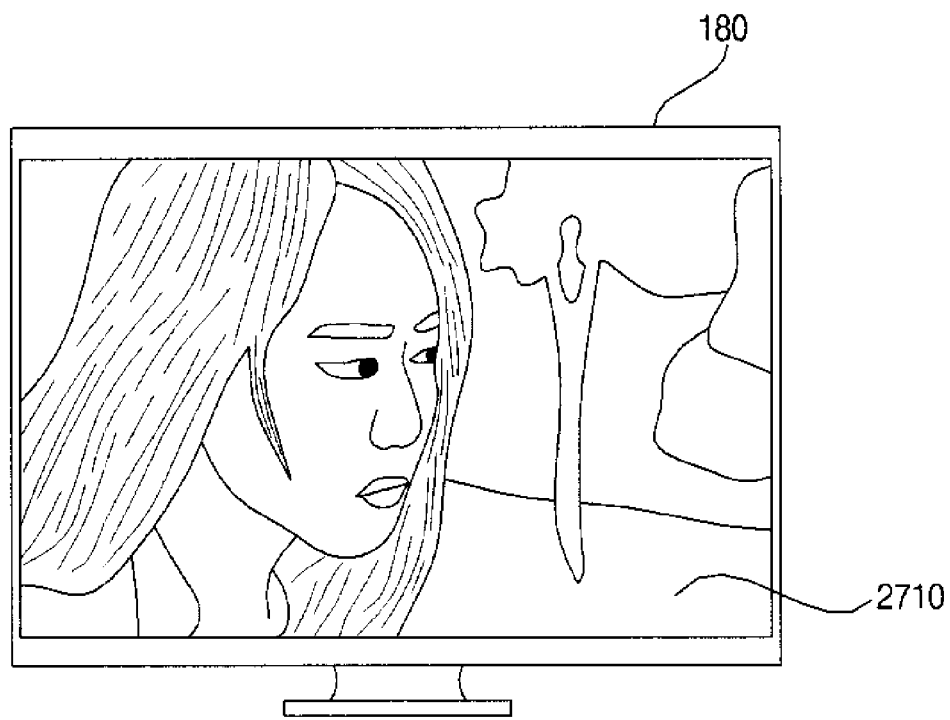
Figure 37:
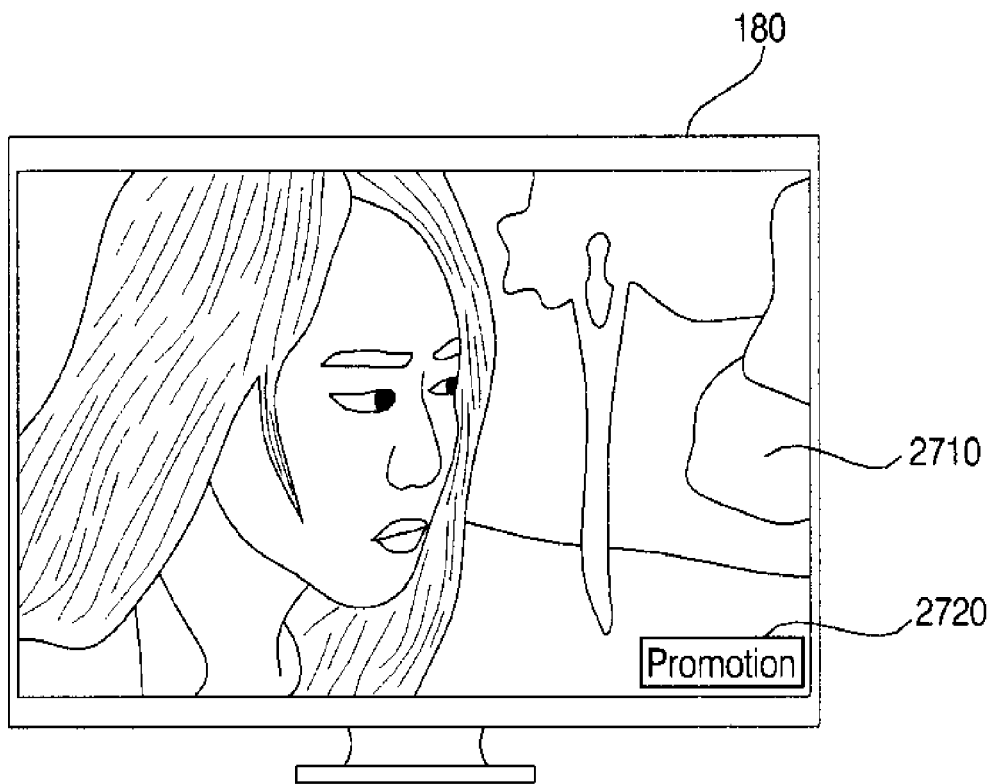

FIGS. 36 and 37 illustrate an exemplary operation for displaying an object indicating reception of a notification, while an image is being displayed fullscreen.

Upon receipt of a new notification or a notification update through the network interface 130 or the tuner 110 while an image 2710 is being displayed on the display 180 as illustrated in FIG. 36, an object 2720 indicating reception of a notification may pop up on the display 180.

Upon user selection of the object 2720, a home screen as illustrated in FIG. 24 may appear, in which the PROMOTION card object 2080 is focused on.

Alternatively or additionally, upon user selection of the object 2720, a promotion screen including a notification list as illustrated in FIG. 27 is fullscreened on the display 180.

As the user is instantly aware of the notification, user convenience increases.

Figure 38:
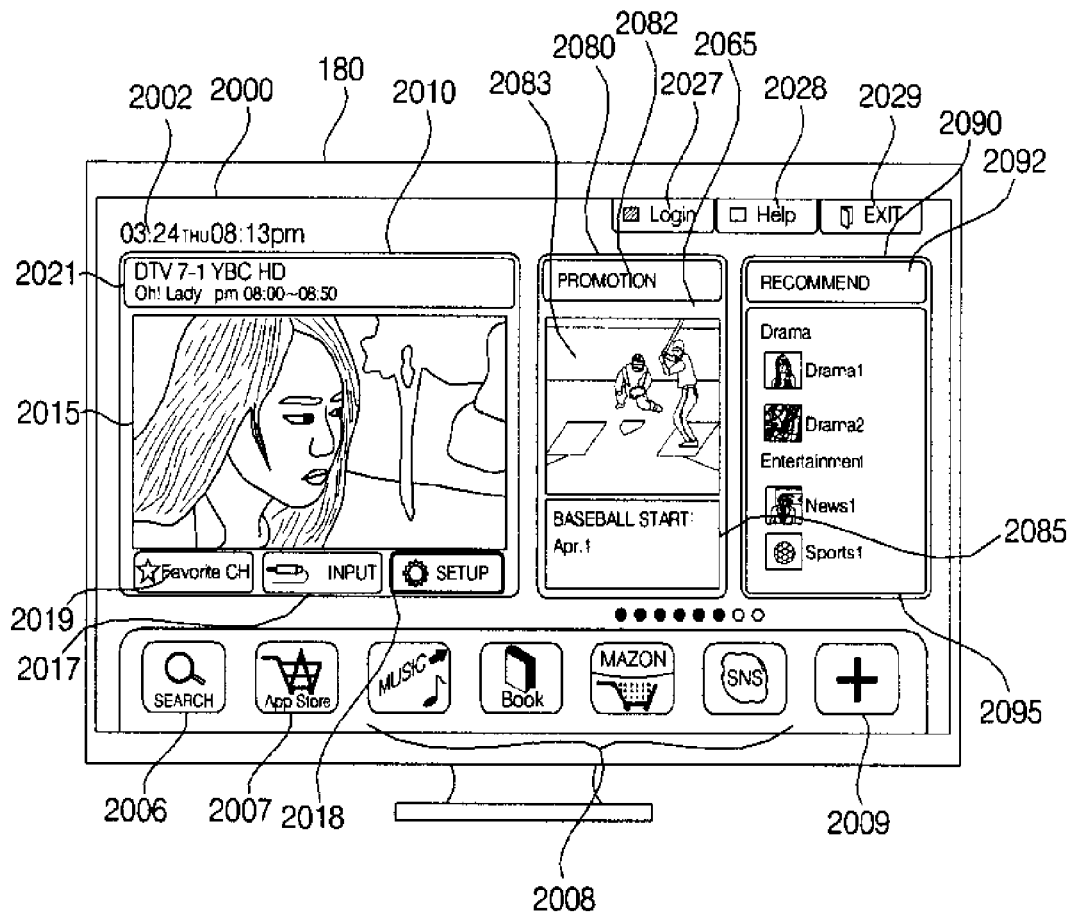
Figure 39:
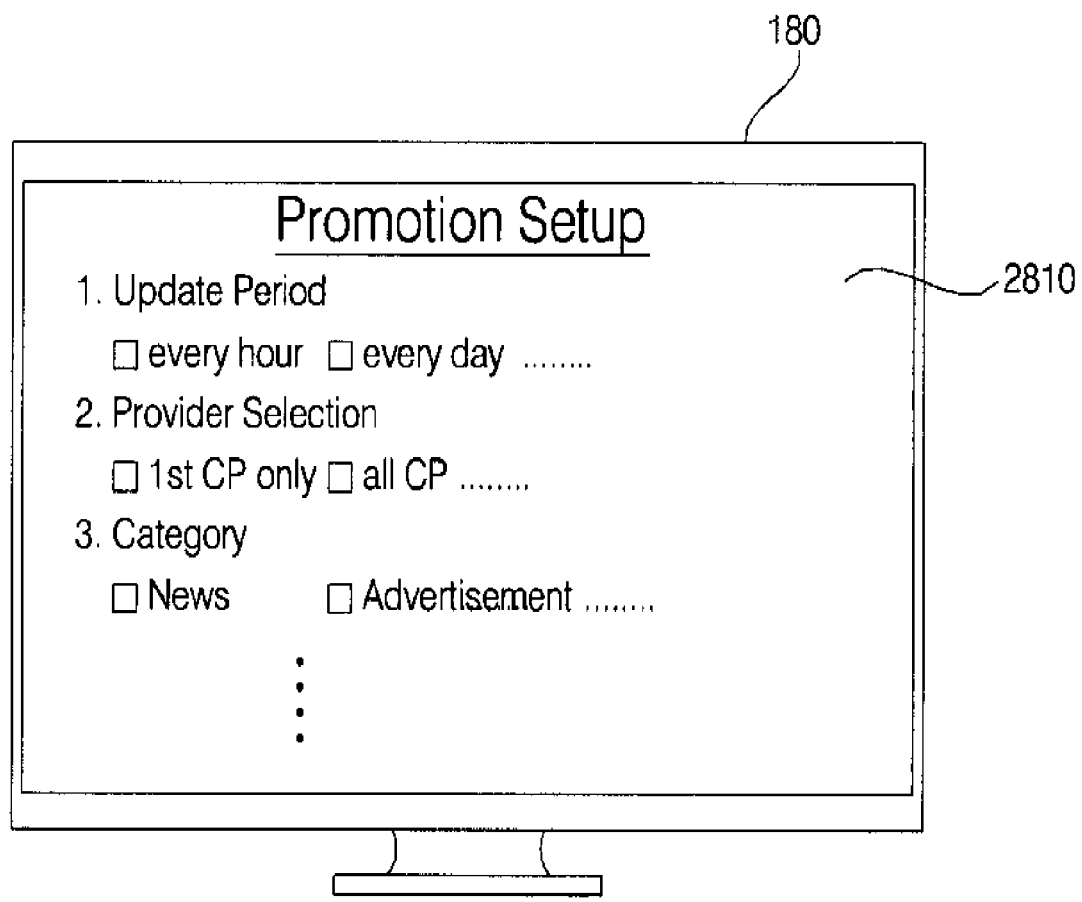

FIGS. 38 and 39 illustrate an exemplary promotion setup operation.

Upon selection of a setup object 2018 with a PROMOTION card object 2082 displayed on the home screen as illustrated in FIG. 38, a promotion setup menu 2810 may be displayed as illustrated in FIG. 39.

Referring to FIG. 39, a promotion update period, a promotion reception time, a promotion provider, and/or a notification type may be set in the promotion setup menu 2810. Many other promotion settings can be considered, such as differentiating promotion settings for individual users. Emergency notification may be set as a default setting that does not allow editing.

The user can receive a desired notification at a desired time using this promotion setup menu.

The image display apparatus and the method for operating the same according to the foregoing exemplary embodiments are not restricted to the embodiments set forth herein. Therefore, variations and combinations of the embodiments set forth herein may fall within the scope of the present invention.

The method for operating an image display apparatus according to the foregoing embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code and code segments to realize the embodiments herein can easily be realized by one of ordinary skill in the art.

While the present invention has been particularly shown and described with reference to embodiments thereof, it will be understood by those of ordinary skill in the art that various changes in form and details may be made therein without departing from the spirit and scope of the present invention as defined by the following claims.

The invention claimed is:

1. A method for operating an image display apparatus that receives and processes a broadcast image, the method comprising:
   receiving a notification through a network interface or a tuner;
   generating a promotion object including the notification by processing the received notification by an object generator;
   displaying the promotion object on a display;
   displaying a pointer which can be shifted based on motion information received from a remote controller,
   wherein the displaying the promotion object includes simultaneously displaying the broadcast image from a broadcast signal in a first area, a plurality of objects classified according to content sources in a second area, an application list including a plurality of application items in a third area, and a view more item for viewing further application items, and
   wherein the plurality of objects includes the promotion object; and
   displaying a setup menu for setting a notification reception or update period, selecting a notification provider, or selecting a notification category for reception,
   wherein at least one of the notification reception, the update period, the notification provider, or the notification category for reception is changed for individual users,
   wherein an emergency notification is set as a default setting that does not allow editing,
   wherein the broadcast image is displayed in a fixed size by a lock function, wherein when the lock function is not performed, the broadcast image is enlarged or contracted by dragging the broadcast image with the pointer of the remote controller, and as the broadcast image is enlarged or contracted, a number of the plurality of objects displayed in the second area is changed, and
   wherein an object indicating a total number of available objects in the second area is displayed.

2. The method according to claim 1, wherein the displaying of the promotion object comprises, if the promotion object is in a hidden area, moving the promotion object to the display by a flicker input of the pointer from the remote controller.

3. The method according to claim 1, wherein the displaying of the promotion object comprises displaying the promotion object on a home screen including the broadcast image, the promotion object, and the application list, upon receipt of a new notification or an updated notification.

4. The method according to claim 1, wherein the notification includes a notice or an advertisement received from at least one of a content provider, a service provider, a network provider, or an application provider.

5. The method according to claim 1, further comprising, upon selection of the notification, full screen displaying an image corresponding to the notification or full screen displaying information linked to the notification.

6. The method according to claim 1, further comprising, upon selection of an object name in the promotion object, displaying a notification list including the notification.

7. The method according to claim 6, wherein notifications are arranged in order of reception or by provider in the notification list.

8. The method according to claim 1, further comprising, upon selection of an object name in the promotion object, displaying a promotion screen including a notification list and an advertisement area.

9. The method according to claim 8, further comprising, upon selection of the advertisement area, displaying the advertisement area full screen.

10. A method for operating an image display apparatus that receives and processes a broadcast image, the method comprising:
    displaying a home screen including the broadcast image from a broadcast signal in a first area on a display, a plurality of objects classified according to content sources in a second area on the display, an application list including a plurality of application items in a third area on the display, and a view more item for viewing further application items;
    displaying a pointer which can be shifted based on motion information received from a remote controller;
    according to an object move input, moving at least one of the plurality of objects displayed in the second area so that the at least one of the plurality of objects is exchanged with at least one other object which is not displayed in the second area;
    displaying a promotion object representing a notification on the home screen according to the object move input; and
    displaying a setup menu for setting a notification reception or update period, selecting a notification provider, or selecting a notification category for reception,
    wherein at least one of the notification reception, the update period, the notification provider, or the notification category for reception is changed for individual users,
    wherein an emergency notification is set as a default setting that does not allow editing,
    wherein the broadcast image is displayed in a fixed size by a lock function,
    wherein when the lock function is not performed, the broadcast image is enlarged or contracted by dragging the broadcast image with the pointer of the remote controller, and as the broadcast image is enlarged or contracted, a number of the plurality of objects displayed in the second area is changed, and
    wherein an object indicating a total number of available objects in the second area is displayed.

11. An image display apparatus for receiving and processing a broadcast image, comprising:
    a tuner for receiving the broadcast image;
    a network interface for transmitting data to or receiving data from a network;
    a card object generator for generating a promotion object including a notification received through the network interface or the tuner by processing the notification; and
    a display for displaying the promotion object,
    wherein the display simultaneously displays a broadcast image from the broadcast signal in a first area, a plurality of objects classified according to content sources in a second area, an application list including a plurality of application items in a third area, and a view more item for viewing further application items and is configured to display a pointer which can be shifted based on motion information received from a remote controller,
    wherein the plurality of objects includes the promotion object,
    wherein the display displays a setup menu for setting a notification reception or update period, selecting a notification provider, or selecting a notification category for reception, wherein at least one of the notification reception, the update period, the notification provider, or the notification category for reception is changed for individual users, wherein an emergency notification is set as a default setting that does not allow editing, wherein the broadcast image is displayed in a fixed size by a lock function, wherein when the lock function is not performed, the broadcast image is enlarged or contracted by dragging the broadcast image with the pointer of the remote controller, and as the broadcast image is enlarged or contracted, a number of the plurality of objects displayed in the second area is changed, and wherein an object indicating a total number of available objects in the second area is displayed.

12. The image display apparatus according to claim 11, wherein upon receipt of the notification with the image displayed on the display, the display displays a home screen including the broadcast image, the promotion object, and the application list.

13. The image display apparatus according to claim 11, wherein upon receipt of a new notification or an updated notification, the display displays the promotion object on a home screen including the broadcast image and the application list.

14. The image display apparatus according to claim 11, wherein upon selection of the notification in the promotion object, the display displays an image corresponding to the notification full screen or displays information linked to the notification full screen.

15. The image display apparatus according to claim 11, further comprising:

the remote controller for transmitting a control signal; and a platform for controlling transmission or reception of data through the network according to the control signal received from the remote controller, wherein the platform includes an Operating System (OS) kernel and an application layer operating on the OS kernel, the application layer including an application that can be downloaded from the network and installed or deleted.

* * * * *